United States Patent
Yokoi et al.

(10) Patent No.: US 6,487,149 B1
(45) Date of Patent: Nov. 26, 2002

(54) OPTICAL RECORDING AND REPRODUCING METHODS FOR OPTICAL DISK

(75) Inventors: Kenya Yokoi; Akihiko Shimizu; Hiroshi Koide, all of Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/413,861

(22) Filed: Oct. 7, 1999

(30) Foreign Application Priority Data

| Oct. 9, 1998 | (JP) | 10-288336 |
| Oct. 9, 1998 | (JP) | 10-288341 |
| Nov. 11, 1998 | (JP) | 10-321006 |
| Jan. 26, 1999 | (JP) | 11-016684 |
| Jan. 26, 1999 | (JP) | 11-016687 |

(51) Int. Cl.$^7$ ............................................... G11B 5/09
(52) U.S. Cl. ................................. 369/47.25; 369/47.51; 369/53.31
(58) Field of Search .......................... 369/47.15, 47.5, 369/47.51, 47.53, 47.54, 47.25, 47.27, 53.26, 53.27, 53.31, 53.33, 53.35, 124.07, 124.1, 124.11, 124.12, 116

(56) References Cited

U.S. PATENT DOCUMENTS 5,859,820 A * 1/1999 Nagasawa et al. ........ 369/47.35

FOREIGN PATENT DOCUMENTS

| JP | 5-128564 | 5/1993 |
| JP | 6-290462 | 10/1994 |
| JP | 9-17029 | 1/1997 |
| JP | 9-326138 | 12/1997 |

* cited by examiner

Primary Examiner—Paul W. Huber
(74) Attorney, Agent, or Firm—Dickstein Shapiro Morin & Oshinsky LLP

(57) ABSTRACT

An optical recording method for an optical disk having a disk surface portion in which prepits, indicative of preformat information, are formed. In the optical recording method, a portion of a data signal which matches one of the prepits and corresponds to a write mark radially adjacent to one of the prepits is detected. Marks are recorded along a track of the disk by selectively using one of an optimal recording power and a proper recording power level, in accordance with the non-match portion or the match portion of the data signal. A radial width of the marks recorded in accordance with the match portion of the data signal is smaller than a radial width of the marks recorded in accordance with the non-match portion of the data signal. An optical reproducing method is adapted to accurately detect a wobble signal and a prepit signal from the optical disk to which data is recorded by the above optical recording method. Further, a wobble/prepit detection method for optical recording and reproduction is adapted to accurately detect the wobble signal and the prepit signal from the optical disk.

22 Claims, 16 Drawing Sheets

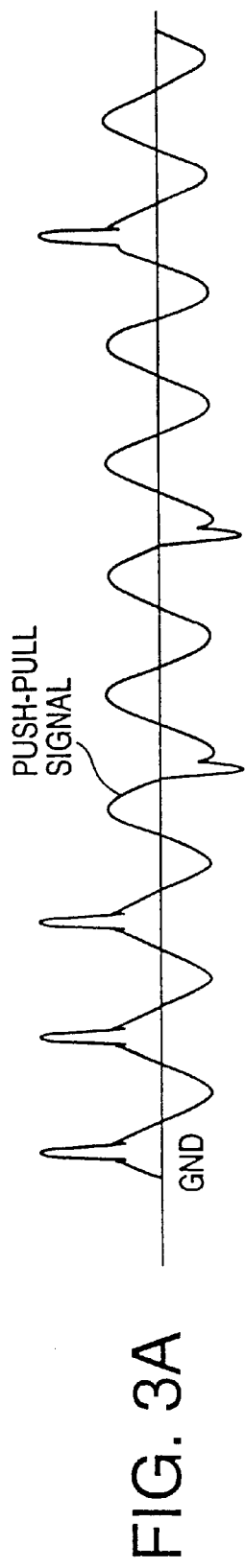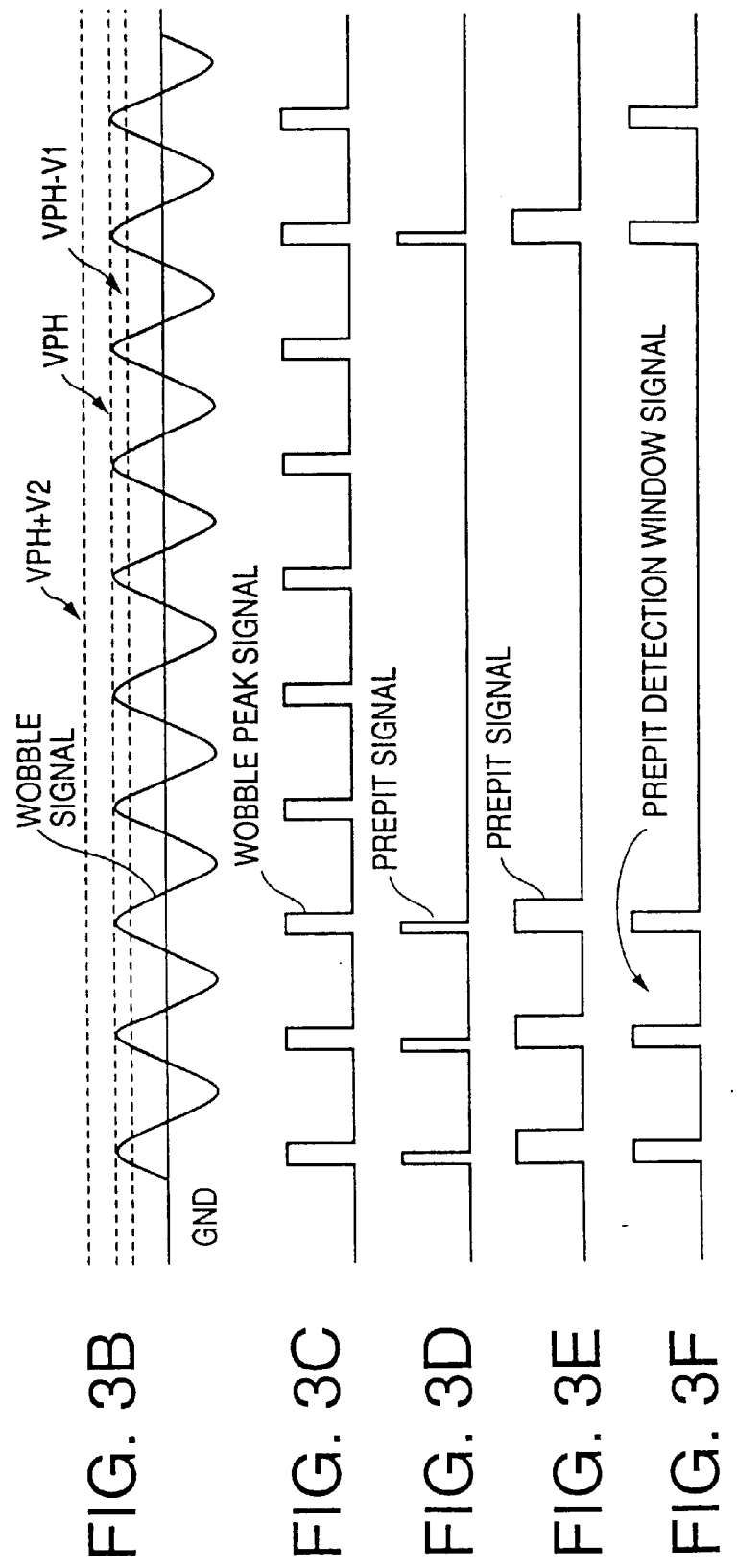

FIG. 10
PRIOR ART
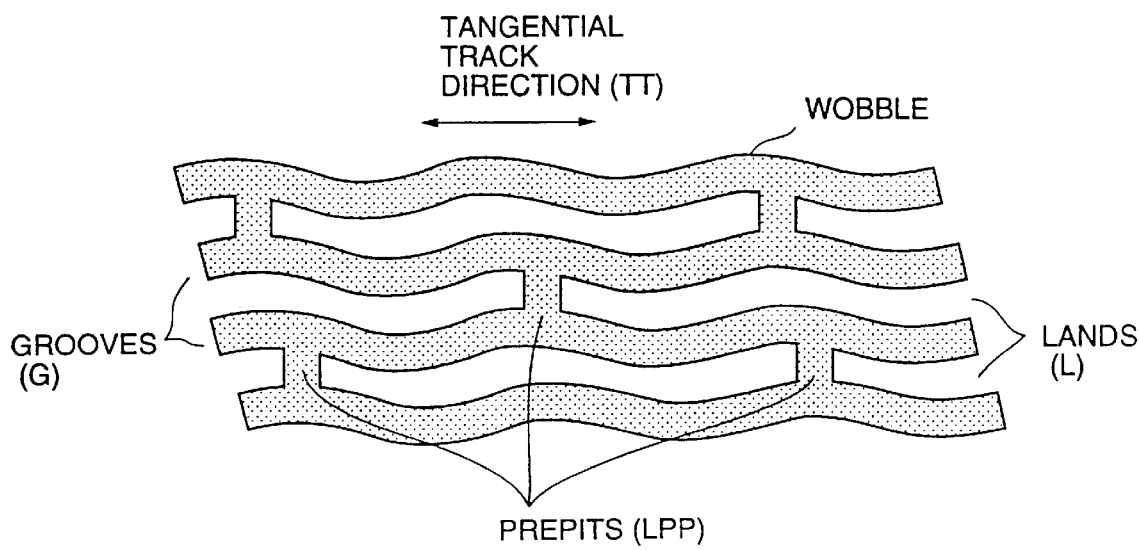
FIG. 11A
FIG. 11B
PRIOR ART
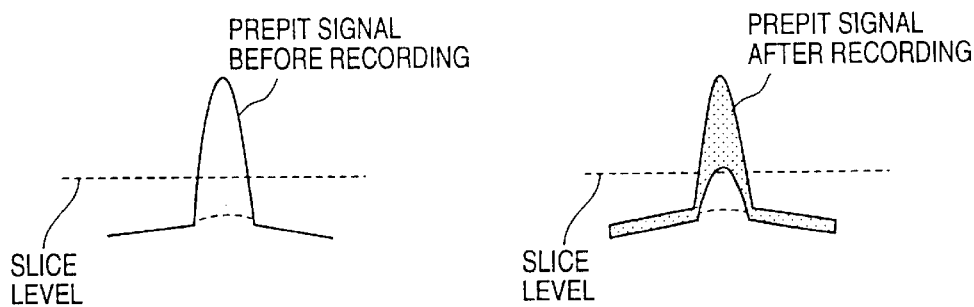

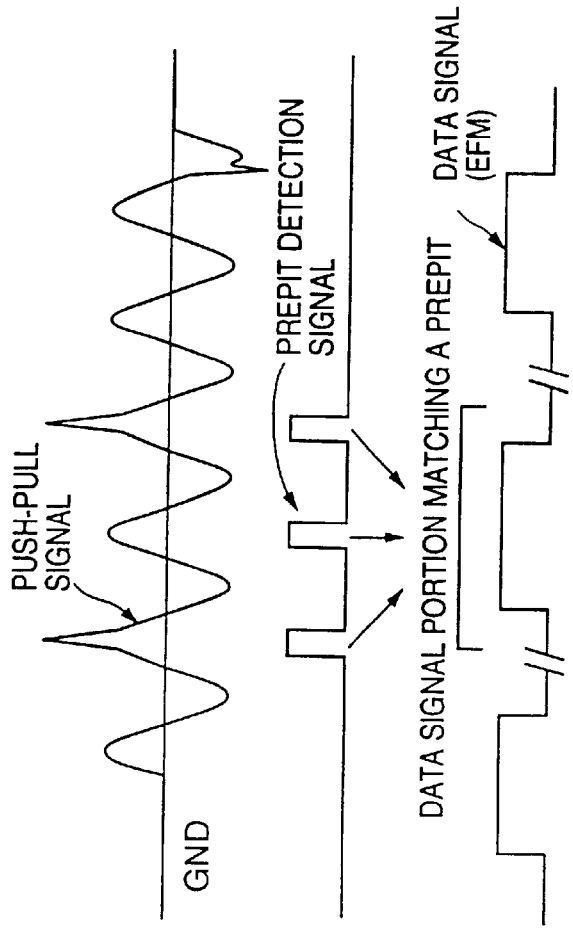
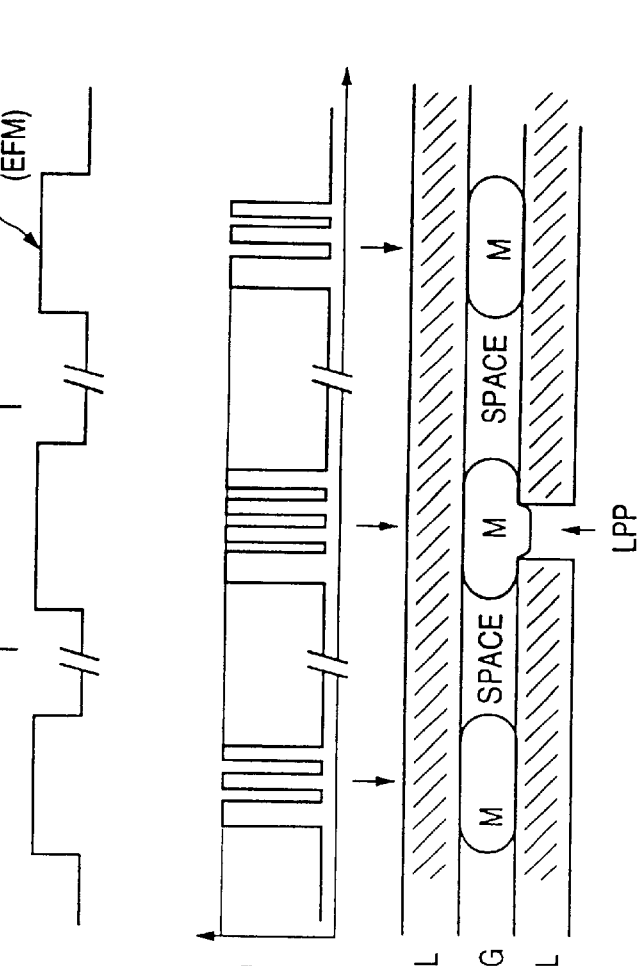
FIG. 12A
FIG. 12B
FIG. 12C
FIG. 12D PRIOR ART
FIG. 12E PRIOR ART

FIG. 15A S1
FIG. 15B S2
FIG. 15C S3
FIG. 15D S4
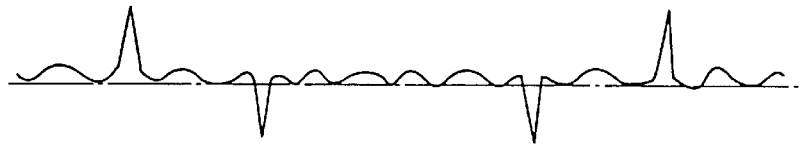
FIG. 15E S5
FIG. 15F S6
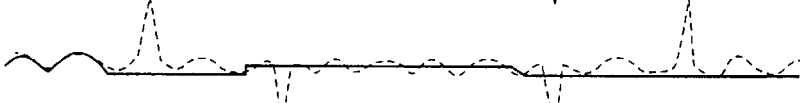
FIG. 15G S7
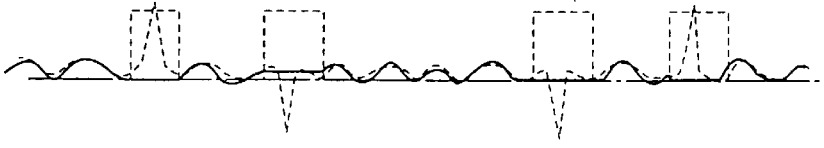
FIG. 15H S8
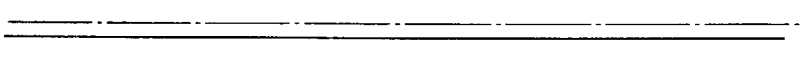
FIG. 15I S9
FIG. 15J S10

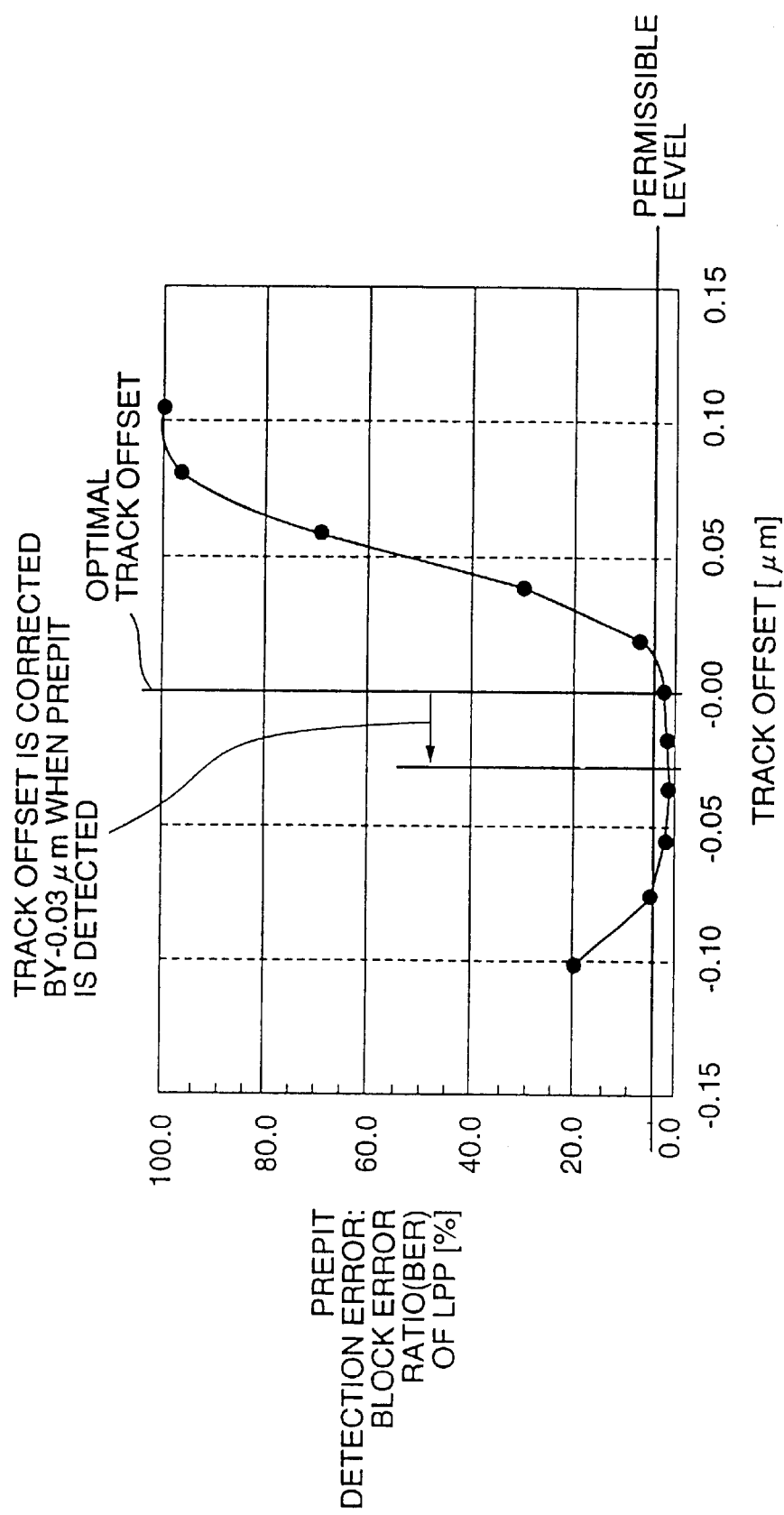

OPTICAL RECORDING AND REPRODUCING METHODS FOR OPTICAL DISK

BACKGROUND OF THE INVENTION

(1) Field of the Invention

The present invention relates to optical recording and reproducing methods for an optical disk having a disk surface portion in which prepits, indicative of preformat information, are formed.

(2) Description of the Related Art

Recordable optical storage media are known. Generally, in a recordable optical disk, preformat information, including address information, rotation control sync marks and record position control sync marks, is recorded. For example, a CD-R (compact disk recordable) or a MD (mini-disk) includes a disk surface portion in which wobble grooves are formed in order to derive a wobble signal, indicative of the rotation control sync information, from the wobble grooves.

As disclosed in Japanese Laid-Open Patent Application No. 9-326138, there is known an optical disk having a disk surface portion in which prepits, indicative of the preformat information (for example, the address information), are formed. In the optical disk disclosed in the above publication, the wobble grooves are formed as the tracks, and the lands between neighboring grooves are used to form the prepits at given distances along the track. These prepits are called the land prepits (LPP). Even when the track pitch is small, the prepits can be continuously formed on the lands of the disk without interruption, and the preformat information derived from such prepits of the optical disk is useful for obtaining accurate address information and accurate rotation control sync information.

FIG. 10 shows a track structure of an optical disk as disclosed in the above publication.

As shown in FIG. 10, in the disk surface portion of the optical disk, wobble grooves G are formed to extend in a tangential track direction TT of the disk, and land prepits LPP are formed on the lands L between neighboring grooves. In the optical disk in the above preformat structure, data is written in the grooves and the lands acting as a guard band. It is intended to prevent the influence of the prepits (on the lands) to the data recorded in the grooves. The lowering of recording density of the optical disk due to the preformat information can be avoided, and the compatibility with read-only optical storage media, such as CD (compact disk) and DVD (digital video disk), can be maintained.

As disclosed in the above publication or Japanese Laid-Open Patent Application No. 9-17029, a method of detecting the preformat information from the optical disk of the above type is known.

In the preformat information detection method of the above publications, a push-pull signal is derived from a reflected laser beam from the optical disk by using a 4-segment photodetector. The push-pull signal is supplied to a high-pass filter, and the direct-current component of the push-pull signal is eliminated by the high-pass filter. The resulting signal is converted into a digital signal by using a slicer (comparator). The digital signal is subjected to demodulation so that a prepit signal indicative of the preformat information, such as the address information, is produced.

In a conventional optical recording method, an optimal recording power is predetermined which is the most suitable laser power of a laser light source for minimizing the amount of jitter in data recording. In the conventional optical recording method, this optimal recording power is used to record data to the optical disk, with respect to the entire track of the optical disk, even when the optical disk of the type shown in FIG. 10 is accessed.

FIG. 12A through FIG. 12E are diagrams for explaining a conventional optical recording method. FIG. 12A shows a waveform of a push-pull signal produced at an output of a high-pass filter. FIG. 12B shows a waveform of a prepit signal derived from the push-pull signal. FIG. 12C shows a waveform of a data signal produced by an EFM (eight-to-fourteen modulation) decoder. FIG. 12D shows a waveform of an LD (laser diode) emission power signal. FIG. 12E shows a pattern of write marks recorded along a track of the optical disk in accordance with the LD emission power signal.

When recording write marks along a track (groove) of the optical disk at the optimal recording power, the LD emission power waveform of FIG. 12D is used. As shown in FIG. 12E, the groove "G" is interposed between the neighboring lands "L", and this prevents the write marks from radially extending beyond the boundaries between the groove G and the lands L. Hence, the write marks "M" have a radial width which is substantially equal to a radial width of the groove "G".

However, in the optical disk of the type of FIG. 10, the prepits "LPP" are formed on the lands L before data is recorded to the optical disk. As shown in FIG. 12E, the center write mark "M" which is located radially adjacent to the prepit "LPP" may extend beyond the boundary between the groove G and the land L (with the prepit LPP). This causes the reflected laser beam from the prepit LPP of the optical disk to be lowered due to the presence of the write mark M adjacent to the prepit LPP. Also, the amplitude of the push-pull signal corresponding to this position of the optical disk will be lowered. The amplitude of a prepit signal in the conventional optical recording method may be significantly degraded due to the presence of the write mark radially adjacent to the corresponding prepit in the optical disk.

FIG. 11A shows a prepit signal before recording, and FIG. 11B shows a prepit signal after recording which may be produced in the conventional optical recording method.

When recording the write marks along the track (groove) of the optical disk in accordance with the data signal as shown in FIG. 12C, the write marks and the spaces between write marks on the groove are likely to confront the positions of the prepits on the neighboring lands with equal probability. The amplitude of the prepit signal always varies in accordance with the prepit pattern.

As shown in FIG. 11A, the amplitude of the prepit signal before the write marks are recorded to the optical disk is highly stable without significant degradation. By comparing the prepit signal with a slice level of the slicer, it is possible to accurately detect the preformat information from the optical disk.

However, if the write marks are already recorded along the entire track of the optical disk at the optimal recording power, the amplitude of the prepit signal becomes significantly unstable as shown in FIG. 11B. For example, when the prepit on the land aligns with the write mark on the neighboring groove, the peak amplitude of the prepit signal is reduced to below ½ of the peak amplitude of FIG. 11A. In such a case, the prepit signal cannot be properly detected by using the slice level of the slicer. When the prepit on the land aligns with the space between write marks on the neighboring groove, the peak amplitude of the prepit signal is substantially the same as the peak amplitude of FIG. 11A. For this reason, it is difficult for the conventional optical recording method to provide accurate detection of the preformat information from the optical disk.

Further, as disclosed in Japanese Laid-Open Patent Application No. 5-128564, a method of detecting the wobble signal from the optical disk of the above type is known. The conventional optical reproducing method of the above publication is aimed at obtaining accurate detection of the wobble signal even when a tilt of the optical axis of the objective lens with respect to the optical disk surface arises. In the method of the above publication, the gains of outputs from two photodiodes of a 2-segment photodetector are adjusted to be equal to each other. A difference signal indicative of a difference between the reproducing signals output from the photodiodes is produced by subtraction, and the difference signal is passed through a wobble decoder so that the rotation control sync information is produced the wobble signal. However, when the write mark is radially adjacent to the prepit in the optical disk, it is difficult for the conventional optical reproducing method to accurately detect the wobble signal and the prepit signal from the optical disk with data written thereto.

As disclosed in Japanese Laid-Open Patent Application No. 6-290462, a method of detecting the wobble signal from the optical disk of the above type is known. The conventional optical reproducing method of the above publication is aimed at obtaining accurate detection of the wobble signal. In the method of the above publication, the outputs from two photodiodes of a 2-segment photodetector are supplied to two normalization circuits, and a sum signal indicative of a sum of the outputs of the photodiodes is supplied to the normalization circuits. The reproducing signals output from the photodiodes are normalized at the normalization circuits by the sum signal. A difference signal indicating of a difference between the normalized signals is produced by subtraction, and the difference signal is passed through a band-pass filter so that the wobble signal is produced. However, when the write mark is radially adjacent to the prepit in the optical disk, it is difficult for the conventional optical reproducing method to accurately detect the wobble signal and the prepit signal from the optical disk with data written thereto.

SUMMARY OF THE INVENTION

An object of the present invention is to provide improved optical recording and reproducing methods in which the above-described problems are eliminated.

Another object of the present invention is to provide an optical recording method which allows accurate detection of the preformat information from the optical disk with data written thereto, by minimizing the degradation of the prepit signal when the write mark is radially adjacent to the prepit in the optical disk.

Another object of the present invention is to provide an optical reproducing method which provides accurate detection of the wobble signal and the prepit signal from the optical disk with data written thereto, with good reliability, even when the write mark is radially adjacent to the prepit in the optical disk.

Another object of the present invention is to provide a wobble/prepit detection method for optical recording and reproduction of the optical disk, which provides accurate detection of the wobble signal and the prepit signal from the optical disk with data written thereto, with good reliability, even when the write mark is radially adjacent to the prepit in the optical disk.

The above-mentioned objects of the present invention are achieved by an optical recording method for an optical disk having a disk surface portion in which prepits, indicative of preformat information, are formed, the optical recording method including the steps of: detecting a portion of a data signal which matches one of the prepits and corresponds to a write mark radially adjacent to one of the prepits; recording marks along a track of the disk, using an optimal recording power, in accordance with a non-match portion of the data signal which does not match any of the prepits but corresponds to a write mark, the recorded marks having a first width in a radial direction of the disk; and recording marks along the track of the disk, using a proper recording power level, in accordance with the match portion of the data signal, the recorded marks having a second width in the radial direction which is smaller than the first width.

The above-mentioned objects of the present invention are achieved by an optical reproducing method for an optical disk having a disk surface portion in which wobble grooves indicative of rotation control sync information are formed to create a wobble signal, and prepits indicative of preformat information are formed to create a prepit signal, the optical reproducing method including the steps of: providing an automatic gain control AGC unit for each of photodiodes contained in a photodetector of a pickup, the AGC units being connected to the photodiodes, and each AGC unit providing a gain of a detection current output by a corresponding one of the photodiodes; detecting a portion of a data signal which matches one of the prepits and corresponds to a write mark radially adjacent to one of the prepits; detecting the wobble signal and the prepit signal along a track of the disk, using optimal gains of the AGC units, in accordance with a non-match portion of the data signal which does not match any of the prepits but corresponds to a write mark; and detecting the wobble signal and the prepit signal along the track of the disk, using reduced gains of half of the AGC units and the optimal gains of the other half of the AGC units, in accordance with the match portion of the data signal.

The above-mentioned objects of the present invention are achieved by a wobble/prepit detection method for optical recording and reproduction of an optical disk having a disk surface portion in which wobble grooves indicative of rotation control sync information are formed, and prepits indicative of preformat information are formed, the wobble/prepit detection method including the steps of: detecting a portion of a data signal which matches one of the prepits and corresponds to one of write marks radially adjacent to one of the prepits; detecting a wobble signal and a prepit signal along a track of the disk, using an optimal track offset, in accordance with a non-match portion of the data signal which does not match any of the prepits but corresponds to one of the write marks; and detecting the wobble signal and the prepit signal along the track of the disk, using a corrected track offset, in accordance with the match portion of the data signal, the corrected track offset having a margin of a prepit detection error to a permissible level, which margin being larger than a margin corresponding to the optimal track offset.

In a preferred embodiment of the optical recording method of the invention, the write marks are recorded along the track of the disk by selectively using one of the optimal recording power or the proper recording power level in accordance with the non-match portion or the match portion of the data signal. The radial width of the marks recorded in accordance with the match portion of the data signal is smaller than the radial width of the marks recorded in accordance with the non-match portion of the data signal. The optical recording method of the present invention is effective in minimizing the degradation of the prepit signal due to the presence of the write mark radially adjacent to the prepit in the optical disk, allowing accurate detection of the preformat information, such as the address information of the optical disk.

In a preferred embodiment of the optical reproducing method of the invention, the wobble signal and the prepit signal are detected along the track of the optical disk by selectively using the optimal gains or the reduced gains of the AGC units in accordance with the non-match portion or the match portion of the data signal. Even when the write mark is radially adjacent to the prepit in the optical disk, it is possible to accurately detect the wobble signal and the prepit signal from the optical disk with good reliability.

In a preferred embodiment of the wobble/prepit detection method of the invention, the wobble signal and the prepit signal are detected along the track of the optical disk by selectively using the optimal track offset or the corrected track offset in accordance with the non-match portion or the match portion of the data signal. Even when the write mark is radially adjacent to the prepit in the optical disk, it is possible to accurately detect the wobble signal and the prepit signal from the optical disk with good reliability.

BRIEF DESCRIPTION OF THE DRAWINGS

Other objects, features and advantages of the present invention will become more apparent from the following detailed description when read in conjunction with the accompanying drawings in which:

FIG. 3A through FIG. 3F are time charts of various signals output by the signal processing circuit of FIG. 2;

FIG. 4A through FIG. 4E are diagrams for explaining a first embodiment of the optical recording method according to the present invention;

FIG. 10 is a diagram showing a track structure of an optical disk;

FIG. 11A and FIG. 11B are diagrams for explaining a prepit signal before recording information to the optical disk and a prepit signal after recording the information to the optical disk;

FIG. 12A through FIG. 12E are diagrams for explaining a conventional optical recording method;

FIG. 15A through FIG. 15J are time charts for explaining an operation of the prepit/wobble detection circuit of FIG. 13;

FIG. 18 is a diagram for explaining a relationship between the track offset and the prepit detection error.

DETAILED DESCRIPTION OF THE PREFERRED EMBODIMENTS

Before explaining the preferred embodiments of the present invention, a description will be given of the basic configuration of an optical disk drive to which the present invention is applied, with reference to FIG. 1 through FIG. 3F, in order to facilitate understanding of the principles of the present invention.

Figure 1:
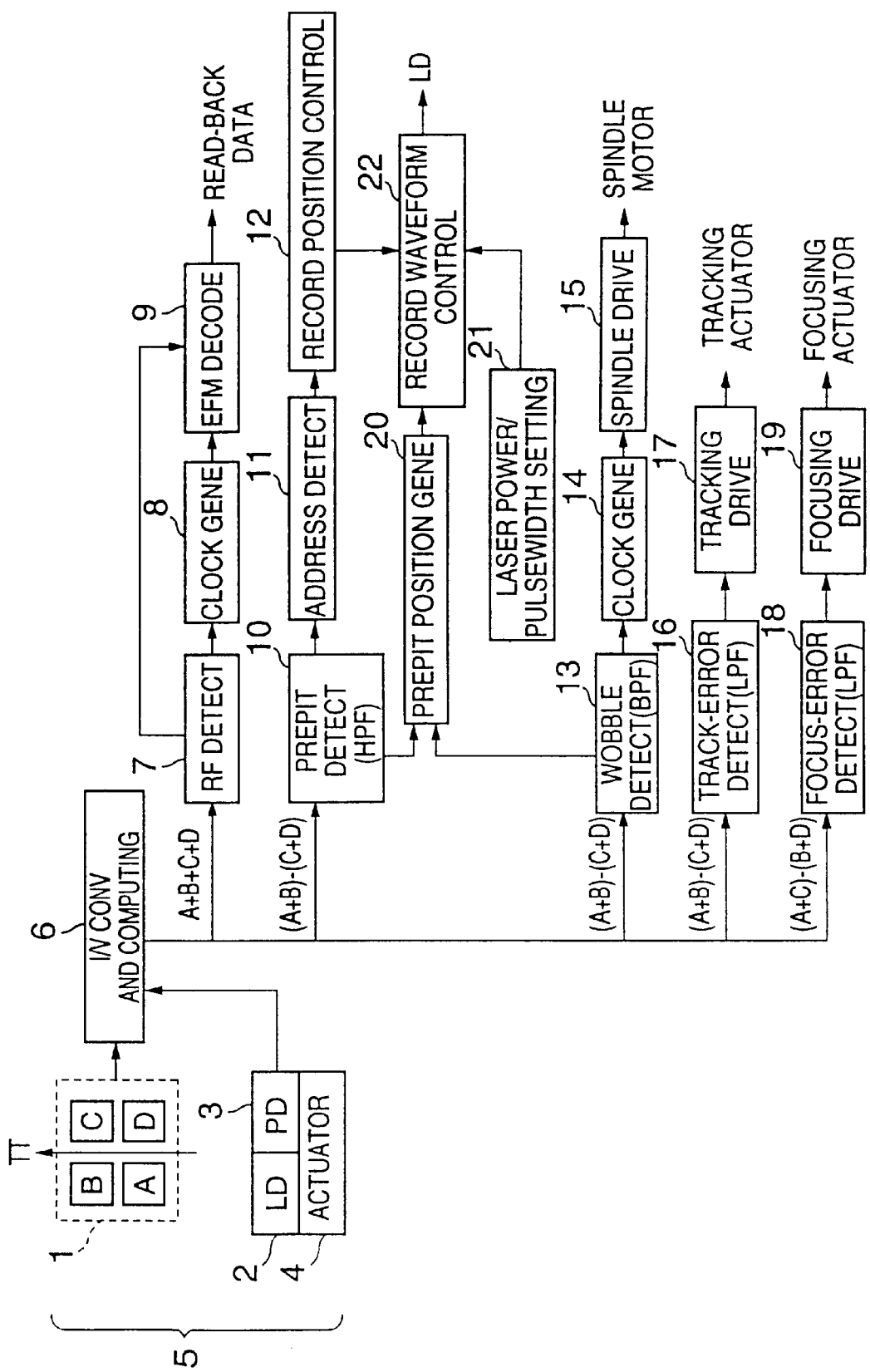
FIG. 1 is a diagram for explaining a control module of an optical disk drive to which an embodiment of the optical recording method of the invention is applied.

FIG. 1 shows a control module of an optical disk drive to which the optical recording method of the invention is applied.

As shown in FIG. 1, a pickup 5, which includes a 4-segment photodetector 1, a laser diode (LD) 2, a monitoring photodiode (PD) 3, an actuator 4 and an optical element, is provided in the optical disk drive. The photodetector 1 includes four photodiodes (PDs) "A" through "D" which are arranged such that the PDs "A" and "B" and the PDs "C" and "D" confront each other and are arrayed in a tangential track (TT) direction of an optical disk to be accessed by the disk drive. The LD 2 emits a laser beam to the optical disk. The monitoring PD 3 detects the amount of the emission laser beam of the LD 2.

Each of the photodiodes "A" through "D" of the photodetector 1 detects a reflected laser beam from the optical disk, and outputs a detection current, indicating the intensity of corresponding one of the reflected laser beams, to a 4-channel current-to-voltage conversion and computing block 6. The conversion and computing block 6 converts the detection currents, output by the photodiode "A" through "D", into voltage signals "A" through "D", and produces a sum signal "(A+B)+(C+D)", a push-pull signal "(A+B)−(C+D)" and a focus-error signal "(A+C)−(B+D)", based on the computations of the voltage signals "A" through "D".

The conversion and computing block 6 supplies the sum signal "(A+B)+(C+D)" to an RF (radio-frequency) detector 7. The conversion and computing block 6 supplies the push-pull signal "(A+B)−(C+D)" to each of a prepit detector 10, a wobble detector 13 and a track-error detector 16. The conversion computing block 6 supplies the focus-error signal "(A+C)−(B+D)" to a focus-error detector 18.

The RF detector 7 includes a waveform equalizer circuit, and outputs an RF signal based on the waveform equalization of the sum signal "(A+B)+(C+D)". A clock generator 8 includes a PLL (phase-locked loop) circuit, and outputs a clock signal based on the RF signal output by the RF detector 7. An EFM (eight-to-fourteen modulation) decoder 9 outputs a read-back data signal based on the RF signal output by the RF detector 7 and on the clock signal output by the clock generator 8.

The focus-error signal "(A+C)−(B+D)" output by the conversion and computing block 6 is generated by using a known astigmatic method. The focus-error detector 18 includes a low-pass filter (LPF) and acts to eliminate the high-frequency component of the focus-error signal. The resulting signal "(A+C)−(B+D)" is supplied from the focus-error detector 18 to a focusing drive block 19. The focusing drive block 19 outputs a drive signal based on the resulting signal "(A+C)−(B+D)", and supplies it to a focusing actuator of the disk drive.

The track-error detector 16 includes a low-pass filter (LPF), and acts to eliminate the high-frequency component of the push-pull signal "(A+B)−(C+D)". The track-error detector 16 supplies a track-error signal through the low-pass filter (LPF) to a tracking drive block 17. The tracking drive block 17 outputs a drive signal based on the track-error signal and supplies it to a tracking actuator of the disk drive.

The wobble detector 13 includes a band-pass filter (BPF) having a center frequency which corresponds to a wobble frequency of the wobble grooves formed in the optical disk. The wobble detector 13 supplies a wobble signal through the band-pass filter (BPF) to a clock generator 14. The clock generator 14 includes a PLL, and outputs a clock signal based on the wobble signal output by the wobble detector 13. A spindle drive block 15 outputs a drive signal based on the clock signal output by the clock generator 14, and supplies it to a spindle motor of the disk drive. In addition, the wobble signal is supplied from the wobble detector 13 to a prepit position generator 20.

The prepit detector 10 includes a high-pass filter (HPF), and acts to eliminate the low-frequency component of the push-pull signal "(A+B)−(C+D)". The prepit detector 10 supplies a prepit signal through the high-pass filter (HPF) to an address detector 11. In addition, the prepit signal is supplied from the prepit detector to the prepit position generator 20.

The address detector 11 detects the address information based on the prepit signal output by the prepit detector 10. A record position control block 12 generates a record position signal based on the address information supplied by the address detector 11, and supplies the record position signal to a record waveform control block 22. A laser power/pulsewidth setting block 21 supplies a laser power/pulsewidth setting signal to the record waveform control block 22.

The prepit position generator 20 generates a prepit position signal based on the wobble signal output by the wobble detector 13 and on the prepit signal output by the prepit detector 10, and supplies the prepit position signal to the record waveform control block 22.

The record waveform control block 22 generates a LD drive signal based on the record position signal output by the record position control block 12 and on the prepit position signal output by the prepit position generator 20, in accordance with the laser power/pulsewidth setting signal output by the laser power/pulsewidth setting block 21. The record waveform control block 22 supplies the LD drive signal to the LD 2 of the pickup 5, so that the data is recorded to the optical disk by controlling the LD 2 of the pickup 5 in accordance with the data signal supplied by the EFM decoder 9.

Figure 2:
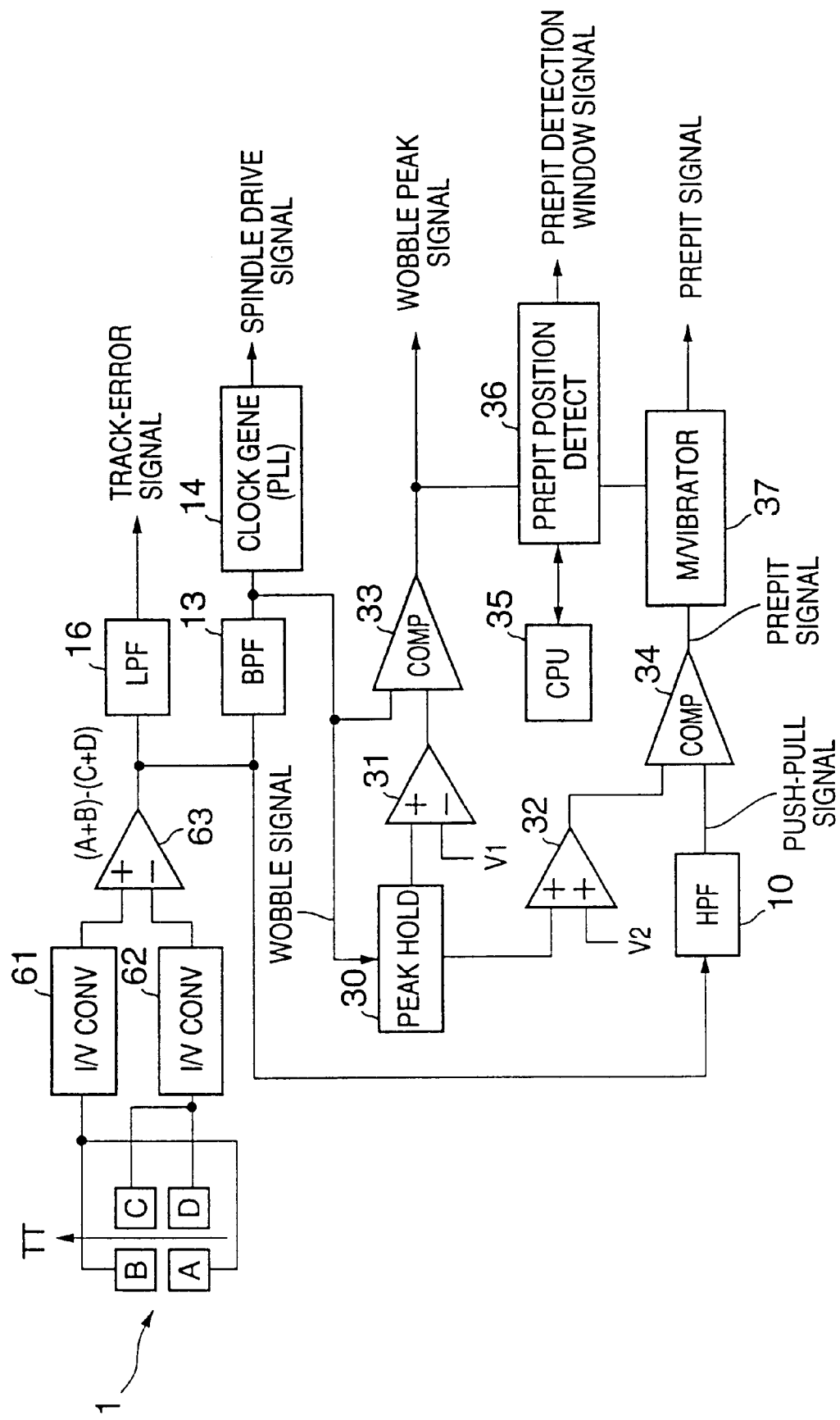
FIG. 2 is a block diagram of a signal processing circuit in the control module of the optical disk drive.

FIG. 2 shows a signal processing circuit in the control module of the disk drive shown in FIG. 1.

In the signal processing circuit of FIG. 2, an I/V converter 61 and an I/V converter 62 are provided. The photodiodes "A" and "B" of the photodetector 1 output the detection currents "A" and "B" to the I/V converter 61, while the photodiodes "C" and "D" of the photodetector 1 output the detection currents "C" and "D" to the I/V converter 62. As described above, each of the photodiodes "A" through "D" of the photodetector 1 outputs the detection current indicating the intensity of corresponding one of the reflected laser beams from the optical disk. The I/V converter 61 converts the detection currents "A" and "B" into corresponding voltages, and outputs a voltage signal (A+B) based on a sum of these voltages. The I/V converter 62 converts the detection currents "C" and "D" into corresponding voltages, and outputs a voltage signal (C+D) based on a sum of these voltages.

The voltage signal (A+B) output from the I/V converter 61 is supplied to a non-inverting input of a differential amplifier 63, and the voltage signal (C+D) output from the I/V converter 62 is supplied to an inverting input of the differential amplifier 63. The differential amplifier 63 outputs the push-pull signal "(A+B)−(C+D)" to each of the prepit detector (HPF) 10, the wobble detector (BPF) 13 and the track-error detector (LPF) 16.

As described above, in the track-error detector 16, the push-pull signal is processed through the low-pass filter (LPF) so that the track-error detector 16 outputs the track-error signal. In the wobble detector 13, the push-pull signal is processed through the band-pass filter (BPF) so that the wobble detector 13 outputs the wobble signal. The clock generator 14 includes the PLL, and outputs a clock signal based on the wobble signal output by the wobble detector 13. The spindle drive signal is produced by the spindle drive block 15 (not shown) based on the clock signal output by the clock generator 14.

As shown in FIG. 2, the wobble signal output from the wobble detector 13 is supplied to each of a peak-hold block 30 and a comparator 33. The peak-hold block 30 outputs a wobble peak-hold voltage "VPH" based on the wobble signal supplied from the wobble detector 13. The peak-hold voltage "VPH" output by the peak-hold block 30 is supplied to a non-inverting input of a differential amplifier 31, and a predetermined voltage "V1" is supplied to an inverting input of the differential amplifier 31. The differential amplifier 31 outputs a lower slice level "VPH−V1" to the comparator 33. The comparator 33 outputs a wobble peak signal based on the wobble signal supplied from the wobble detector 13 and on the lower slice level "VPH−V1" supplied from the differential amplifier 31.

The peak-hold voltage "VPH" output by the peak-hold block 30 is also supplied to a non-inverting input of a summing amplifier 32, and a predetermined voltage "V2" is supplied to a non-inverting input of the summing amplifier 32. The summing amplifier 32 outputs a higher slice level "VPH+V2" to a comparator 34. The push-pull signal is processed through the high-pass filter (HPF) of the prepit detector 10 so that the prepit detector 10 outputs the processed push-pull signal to the comparator 34. The comparator 34 converts the processed push-pull signal into the prepit signal based on the higher slice level "VPH+V2", and the prepit signal is supplied to a monostable multivibrator 37. The pulsewidth of the prepit signal at the output of the comparator 34 changes according to the amplitude of the prepit signal. The multivibrator 37 maintains the pulsewidth of the prepit signal at a constant level, and outputs the prepit signal with the stable pulsewidth.

In the signal processing circuit of FIG. 2, the wobble peak signal, output by the comparator 33, and the prepit signal, output by the multivibrator 37, are supplied to a prepit position detection block 36. A CPU (central processing unit) 35 is connected to the elements of the control module of FIG. 1 including the prepit position detection block 36. The CPU 35 controls the prepit position detection block 36 so that the prepit position detection block 36 outputs a prepit detection window signal based on the wobble peak signal and on the prepit signal. The prepit position detection block 36 includes a demodulator. By controlling the demodulator of the prepit position detection block 36, the CPU 35 detects the preformat information, such as the address information, from the prepit signal and the prepit detection window signal.

FIG. 3A through FIG. 3F are time charts of various signals output by the signal processing circuit of FIG. 2.

FIG. 3A shows a waveform of the push-pull signal produced at the output of the prepit detector (HPF) 10. FIG. 3B shows a waveform of the wobble signal produced at the output of the wobble detector (BPF) 13. FIG. 3C shows a waveform of the wobble peak signal at the output of the comparator 33. FIG. 3D shows a waveform of the prepit signal at the output of the comparator 34. FIG. 3E shows a waveform of the prepit signal at the output of the monostable multivibrator 37. FIG. 3F shows a waveform of the prepit detection window signal at the output of the prepit position detection block 36.

In view of the above-mentioned operations of the signal processing circuit of FIG. 2, the prepit detection window signal of FIG. 3F is more suitable to accurately detect the presence of one of the prepits in the optical disk than the wobble peak signal of FIG. 3C or the prepit signal of FIG. 3E.

A description will now be given of a first embodiment of the optical recording method according to the invention with reference to FIG. 4A through FIG. 4E.

Figure 4A:
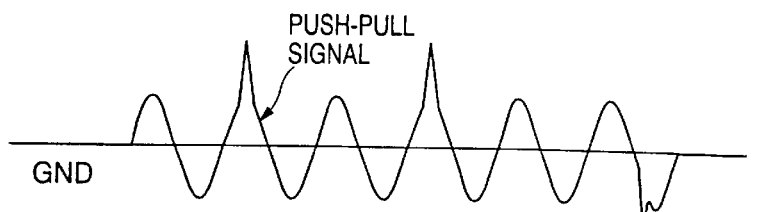
Figure 4B:
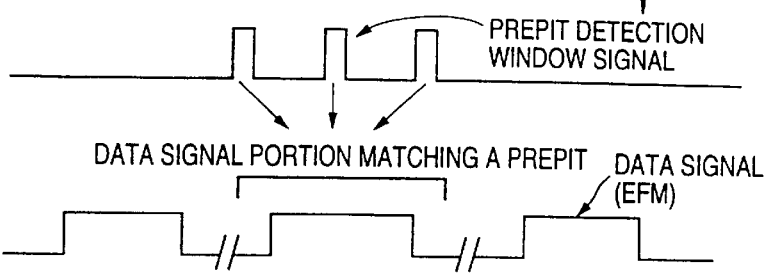

FIG. 4A shows a waveform of the push-pull signal produced at the output of the prepit detector (HPF) 10 in the present embodiment. FIG. 4B shows a waveform of the prepit detection window signal at the output of the prepit position detection block 36 in the present embodiment. FIG. 4C shows a waveform of the data signal at the output of the EFM decoder 9 in the present embodiment.

As shown in FIG. 4B and FIG. 4C, in the present embodiment, the CPU 35 detects a portion of the data signal (output by the EFM decoder 9) which matches one of the prepits of the optical disk and corresponds to a write mark radially adjacent to the prepit, based on an effective period of the prepit detection window signal output by the prepit position detection block 36. Based on the result of the above detection, the CPU 35 controls the LD 2 through the record waveform control block 22, so that write marks are recorded along the track (groove) of the optical disk, by selectively using one of an optimal recording power "P1" or a proper recording power level "P2" in accordance with the non-match portion or the match portion of the data signal. The non-match portion of the data signal does not match any of the prepits but corresponds to one of the write marks.

Figure 4E:
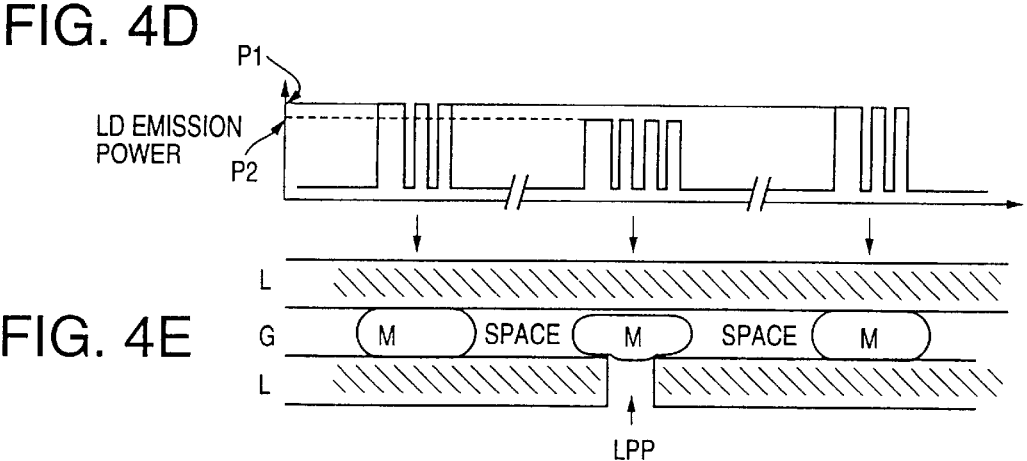

FIG. 4D shows a waveform of an LD emission power signal output by the record waveform control block 22 in the present embodiment. FIG. 4E shows a pattern of write marks recorded along the track (groove) of the optical disk in accordance with the LD emission power signal of FIG. 4D.

As shown in FIG. 4D, the optimal recording power "P1" is the most suitable laser power of the LD 2 of the pickup 5 to minimize the amount of jitter in data recording, and it is predetermined as in the conventional optical recording method. The proper recording power level "P2" is determined by reducing the optimal recording power P1 to a predetermined ratio (95% to 80%) of the optimal recording power P1. In the record waveform control block 22, the optimal recording power "P1" is selected when the data signal does not match any of the prepits but corresponds to one of the write marks, and the proper recording power level "P2" is selected when the data signal matches one of the prepits and corresponds to one of the write marks.

As shown in FIG. 4E, a radial width of the mark (the center write mark "M" radially adjacent to the LPP in FIG. 4E) recorded in accordance with the match portion of the data signal is smaller than a radial width of the marks (the right and left write marks "M" in FIG. 4E) recorded in accordance with the non-match portion of the data signal. As it is recorded by using the proper recording power level P2, the center write mark "M" radially adjacent to the prepit "LPP" does not extend in the radial direction of the disk beyond the boundary between the groove G and the land L.

Figure 5:
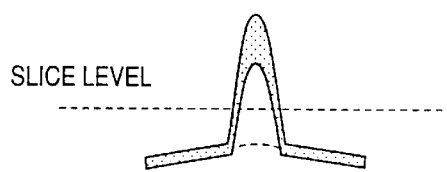
FIG. 5 is a diagram showing a waveform of a prepit signal.

FIG. 5 shows a waveform of a prepit signal after recording, which is produced in the optical recording method of the present embodiment.

In the present embodiment, the write marks are recorded along the track (groove) of the optical disk, by selectively using one of the optimal recording power "P1" or the proper recording power level "P2" in accordance with the non-match portion or the match portion of the data signal. Even when the prepit on the land is adjacent to the write mark on the neighboring groove, the amplitude of the prepit signal is stably high as shown in FIG. 5. Because of the reduced recording power, the write mark radially adjacent to the prepit does not extend in the radial direction of the disk beyond the boundary between the groove G and the land L. The prepit signal can be properly compared with the slice level of the comparator 34. For this reason, it is possible for the optical recording method of the present embodiment to provide accurate detection of the preformat information from the optical disk.

Accordingly, the optical recording method of the present embodiment is effective in minimizing the degradation of the prepit signal due to the presence of the write mark radially adjacent to the corresponding prepit in the optical disk, allowing accurate detection of the preformat information, such as the address information of the optical disk.

A description will be given of a second embodiment of the optical recording method according to the present invention with reference to FIG. 6A through FIG. 6D.

Similar to the previous embodiment of FIG. 4A through FIG. 4D, the control module of the optical disk drive shown in FIG. 1 and the signal processing circuit shown in FIG. 2 are used by the present embodiment.

Figure 6A:
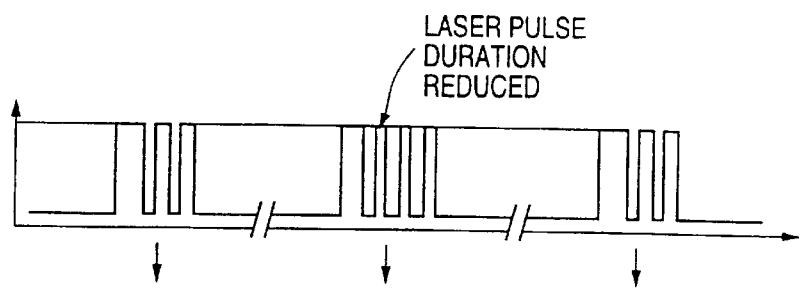
FIG. 6A through FIG. 6D are diagrams for explaining a second embodiment of the optical recording method according to the present invention.
Figure 6B:
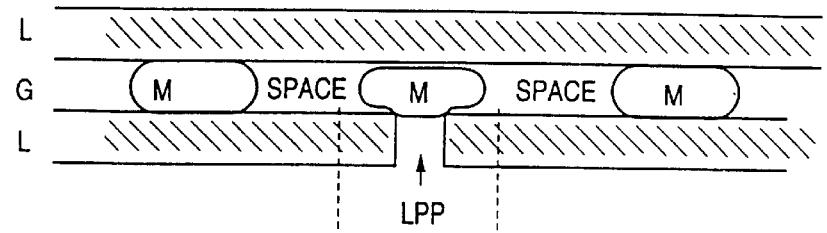

FIG. 6A shows a waveform of the LD emission power signal output by the record waveform control block 22 in the present embodiment. FIG. 6B shows a pattern of write marks recorded along the track (groove) of the optical disk in accordance with the LD emission power signal of FIG. 6A.

In the present embodiment, the write marks are recorded along the track (groove) of the optical disk, by selectively using one of an optimal recording laser pulse duration (the right and left ones indicated in FIG. 6A) or a proper recording laser pulse duration (the center one indicated in FIG. 6A) in accordance with the non-match portion or the match portion of the data signal. In the record waveform control block 22 of the present embodiment, the optimal recording laser pulse duration is selected when the data signal does not match any of the prepits but corresponds to one of the write marks, and the proper recording laser pulse duration (the reduced duration) is selected when the data signal matches one of the prepits and corresponds to one of the write marks.

As shown in FIG. 6B, a radial width of the mark (the center write mark "M" radially adjacent to the prepit LPP in FIG. 6B) recorded in accordance with the match portion of the data signal is smaller than a radial width of the marks (the right and left write marks "M" in FIG. 6B) recorded in accordance with the non-match portion of the data signal. As it is recorded by using the proper recording laser pulse duration, the center write mark "M" radially adjacent to the prepit "LPP" does not extend in the radial direction of the disk beyond the boundary between the groove G and the land L. Hence, even when the prepit on the land is adjacent to the write mark on the neighboring groove, the amplitude of the prepit signal is stably high as shown in FIG. 5. Because of the reduced recording laser pulse duration, the write mark radially adjacent to the prepit does not extend beyond the boundary between the groove G and the land L as shown in FIG. 6B. The prepit signal can be properly compared with the slice level of the comparator 34. For this reason, it is possible for the optical recording method of the present embodiment to provide accurate detection of the preformat information from the optical disk.

However, in the above-described embodiment of FIG. 6A and FIG. 6B, a tangential width of the center write mark "M" in the tangential track direction of the disk is smaller than an ideal tangential width which is the same as a width of the right and left write marks "M" in the tangential track direction of the disk. Although the above-described embodiment provides accurate detection of the prepit signal from the optical disk, the amount of jitter in the data recording at the match portion of the data signal may be increased because of the reduction of the tangential width of the write mark M adjacent to the prepit LPP. A modification of the above-described embodiment of FIG. 6A and FIG. 6B which eliminates the above problem is needed.

Figure 6C:
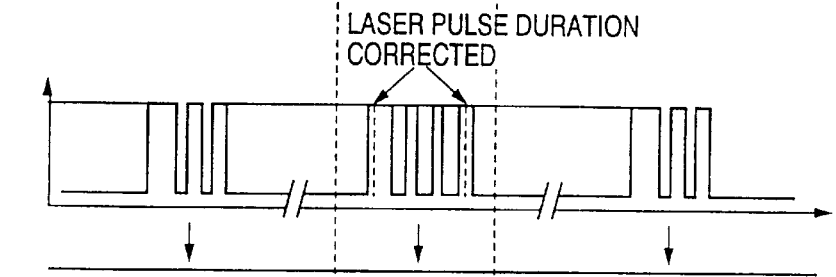
Figure 6D:
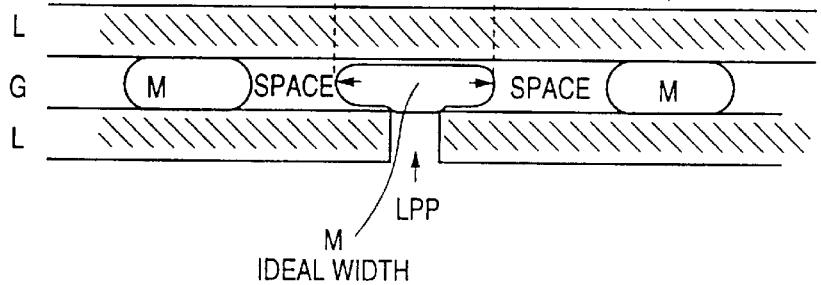

FIG. 6C shows a waveform of the LD emission power signal output by the record waveform control block 22 in the modification of the second embodiment. FIG. 6D shows a pattern of write marks recorded along the track (groove) of the optical disk in accordance with the LD emission power signal of FIG. 6C.

In the modification shown in FIG. 6C and FIG. 6D, the record waveform control block 22 of the present embodiment selects the optimal recording laser pulse duration when the data signal does not match any of the prepits but corresponds to one of the write marks, and selects a corrected recording laser pulse duration when the data signal matches one of the prepits and corresponds to one of the write marks. In the corrected recording laser pulse duration, both a front-end edge and a rear-end edge of the recording laser pulse corresponding to the center write mark "M" are slightly widened as shown in FIG. 6C, such that the tangential width of the center write mark "M" is increased to be equal to the ideal tangential width which is the same as the tangential width of the right and left write marks "M".

As shown in FIG. 6D, because of the corrected recording laser pulse duration, the above-mentioned modification not only can provide accurate detection of the prepit signal from the optical disk but also can prevent the increase of the amount of jitter in the data recording at the match portion of the data signal.

The optical power calibration process is usually carried out as a method of determining the optimal recording power of the laser diode for the optical disk. In an optical power calibration process which utilizes the optical recording method of the invention, the determination of the proper recording power level in addition to the determination of the optimal recording power is made.

Figure 7A:
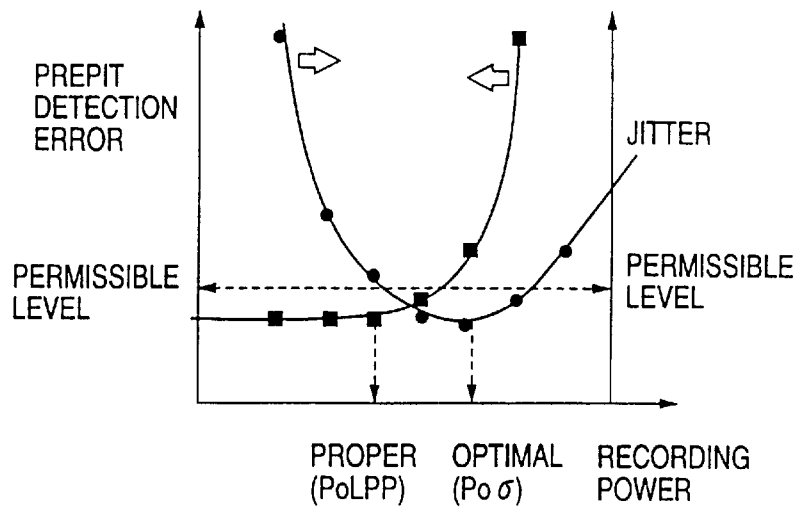
FIG. 7A and FIG. 7B are diagrams for explaining recording characteristics of an organic-dye optical disk and a phase-change optical disk as the experimental results of an optical power calibration process.
Figure 7B:
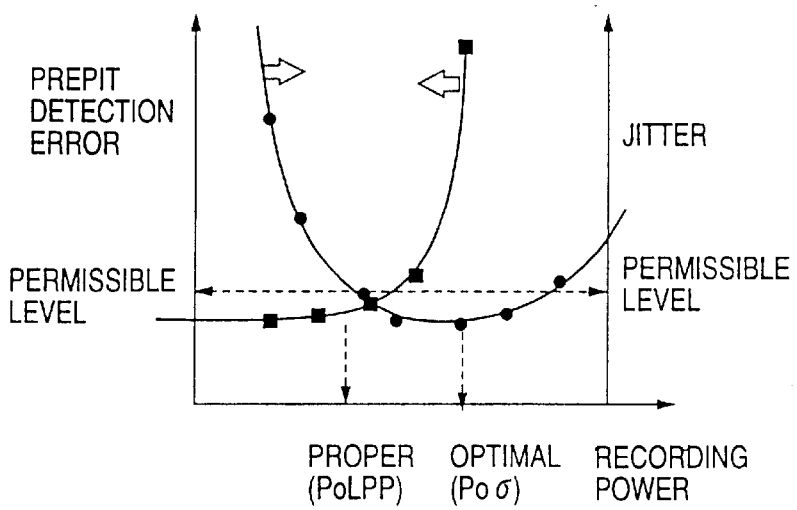

FIG. 7A shows recording characteristics of an organic-dye type optical disk as the experimental results of the optical power calibration process. FIG. 7B shows recording characteristics of a phase-change type optical disk as the experimental results of the optical power calibration process.

In FIG. 7A and FIG. 7B, the recording power, applied to the laser diode 2 of the pickup 5, is increased from a low level to a high level, and the amount (σ) of jitter in the data reproduced from the data signal, and the block error ratio (prepit detection error) of the address information reproduced from the prepit signal are plotted for each recording power level.

Figure 8:
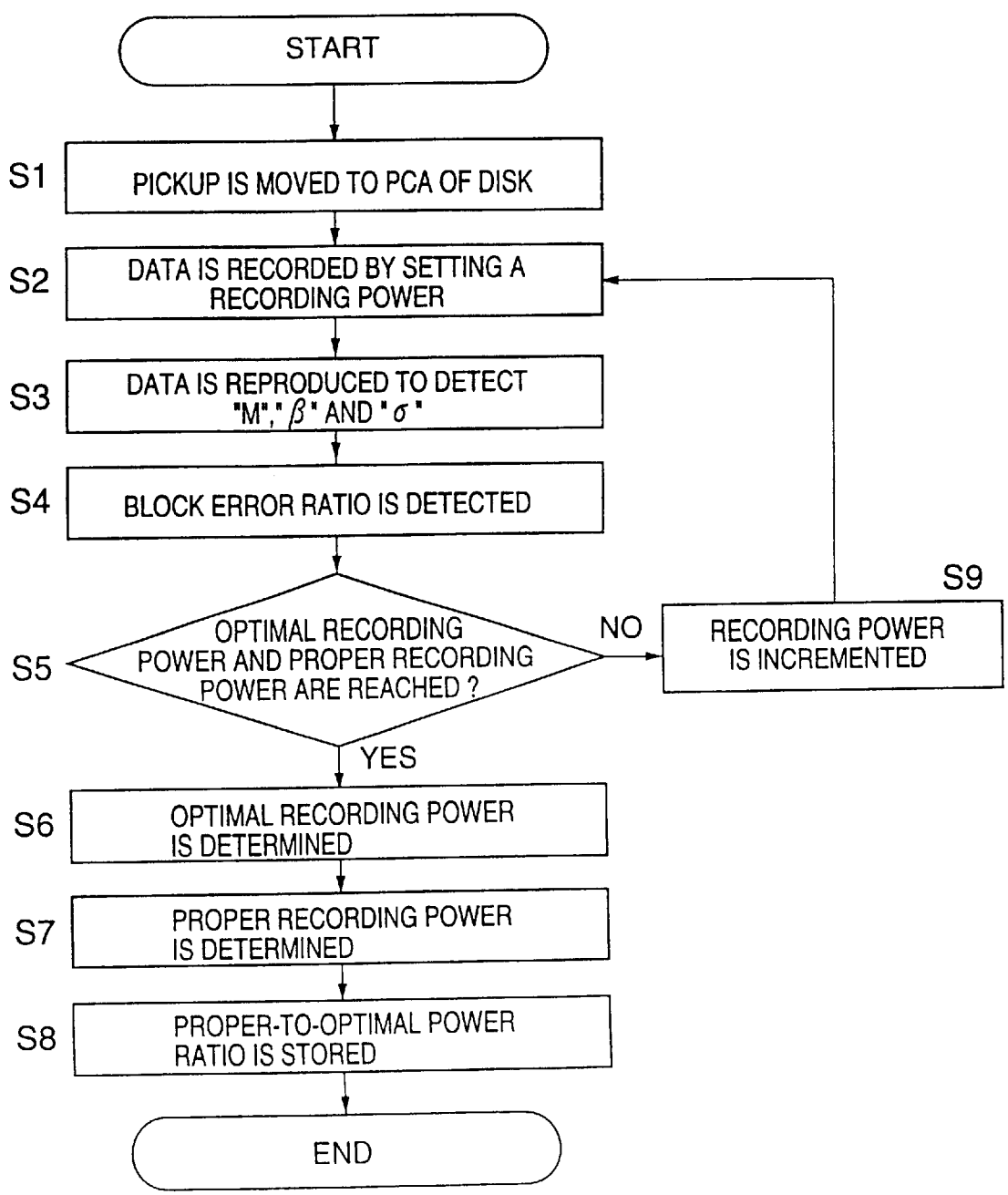
FIG. 8 is a flowchart for explaining an optical power calibration process which utilizes the optical recording method of the present invention.

FIG. 8 shows an optical power calibration process which utilizes the optical recording method of the present invention. The optical power calibration process of FIG. 8 is executed by the CPU 35 of the optical disk drive.

As shown in FIG. 8, at the start of the optical power calibration process, step S1 moves the pickup 5 to a power calibration area (PCA) of the optical disk before recording data to the optical disk. Step S2 sets the recording power to an appropriate value and records data to the optical disk by using the recording power for the laser diode of the pickup 5. The recording power is initially set to an adequately small value. Step S3 reproduces the data from the optical disk and detects the modulation M, the asymmetry β and the jitter σ of the recorded data.

After the step S3 is performed, step S4 detects the block error ratio of the address information reproduced from the prepit signal. Step S5 determines whether the optimal recording power and the proper recording power level are reached, based on the results of the detection obtained at the steps S3 and S4. When the result at the step S5 is negative, step S9 is performed. Step S9 increments the recording power. After the step S9 is performed, the above steps S2–S5 are repeated. On the other hand, when the result at the step S5 is affirmative, step S6 is performed.

Step S6 determines the optimal recording power related to the non-match portion of the data signal, based on the results of the detection obtained at the step S3. After the step S6 is performed, step S7 determines the proper recording power level related to the match portion of the data signal, based on the results of the detection obtained at the step S4. Step S8 calculates the ratio of the proper recording power level to the optimal recording power, and stores the proper-to-optimal ratio in the memory of the CPU 35 and in the optical disk. After the step S8 is performed, the optical power calibration process of FIG. 8 ends.

The execution of the optical power calibration process of FIG. 8 is needed each time the recording of data to the optical disk is performed. However, the proper-to-optimal power ratio is a substantially unchanged value. By using the stored proper-to-optimal power ratio, another optical power calibration process which utilizes the optical recording method of the present invention is possible.

Figure 9:
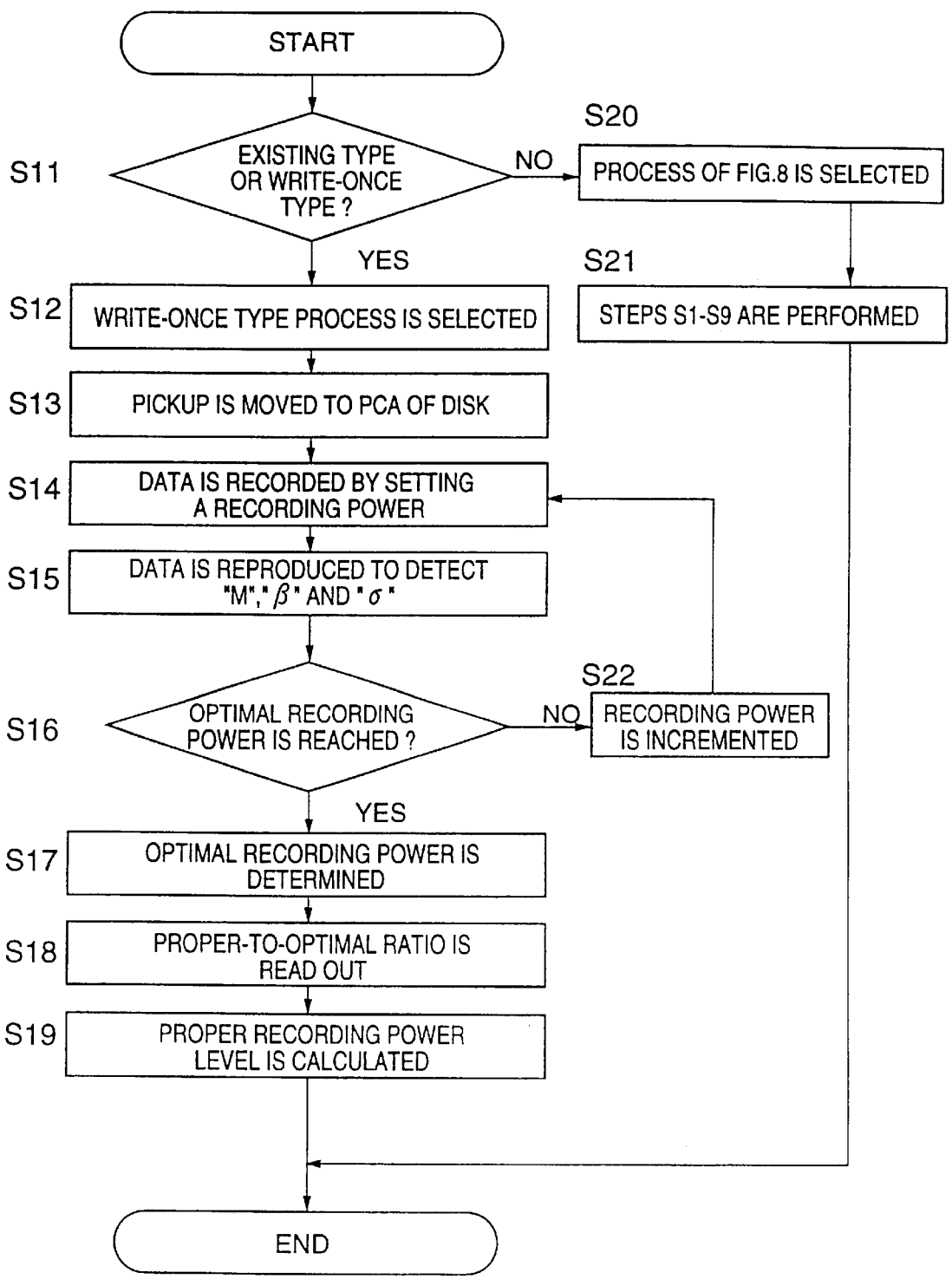
FIG. 9 is a flowchart for explaining another optical power calibration process which utilizes the optical recording method of the present invention.

FIG. 9 shows another optical power calibration process which utilizes the optical recording method of the present invention. The optical power calibration process of FIG. 9 is executed by the CPU 35 of the optical disk drive.

As shown in FIG. 9, at the start of the optical power calibration process, step S11 determines whether the optical disk to be accessed is an existing type or a write-once type.

When the optical disk to be accessed is neither the existing type nor the write-once type at the step S11, step S20 is performed. Step S20 selects the execution of the optical power calibration process of FIG. 8. After the step S20 is performed, step S21 starts the execution of the above steps S1–S9 of FIG. 8, and the description thereof will be omitted.

When the optical disk to be accessed is the existing type or the write-once type at the step S11, step S12 is performed. Step S12 selects the execution of a write-once type optical power calibration process. Step S13 moves the pickup 5 to a power calibration area (PCA) of the optical disk before recording data to the optical disk. Step S14 sets the recording power to an appropriate value and records data to the optical disk by using the recording power for the laser diode 2 of the pickup 5. The recording power is initially set to an adequately small value. Step S15 reproduces the data from the optical disk and detects the modulation M, the asymmetry β and the jitter a of the recorded data.

After the step S15 is performed, step S16 determines whether the optimal recording power is reached, based on the results of the detection obtained at the step S15. When the result at the step S16 is negative, step S22 is performed. Step S22 increments the recording power. After the step S22 is performed, the above steps S14–S16 are repeated. On the other hand, when the result at the step S16 is affirmative, step S17 is performed.

Step S17 determines the optimal recording power related to the non-match portion of the data signal, based on the results of the detection obtained at the step S15. After the step S17 is performed, step S18 reads out the proper-to-optimal power ratio from the memory of the CPU 35 (or from the optical disk). Step S19 calculates the proper recording power level by the product of the optimal recording power by the proper-to-optimal power ratio, and determines the proper recording power level. After the step S19 is performed, the optical power calibration process of FIG. 9 ends.

A description will be given of a more simple method of determining a proper recording power level of the laser diode related to the match portion of the data signal which matches one of the prepits and corresponds to one of the write marks.

Various recording layer materials are used as the recording layer of recordable optical storage media. However, it has been found from the experimental results of optical recording that, if a specific recording layer material of the optical disk is given, a ratio of the proper recording power level (related to the match portion of the data signal which matches one of the prepits and corresponds to one of the write marks) to the optimal recording power (related to the non-match portion of the data signal which does not match any of the prepits but corresponds to one of the write marks) is a substantially unchanged value. If a specific recording layer material is given, the ratio of the proper recording power level to the optimal recording power can be determined as being a constant value according to the type of the recording layer material. According to the above concept of the invention, a proper recording power level for the selected optical disk can be determined by the product of the optical recording power by the proper-to-optimal power ratio. By using the above concept, the optical recording method of the embodiment of FIG. 4D described above can be easily carried out.

In a case of the organic-dye type optical disk, the recording layer is made of an organic dye material. Suitable examples of the organic dye material for the optical disk of this type are polymethine, phthalocyanine, naphthalocyanine, squaryllium, xanthene, triphenylmethane, azulene, tetrahydrocoline, naphthoquinone, anthraquinone, phenanthrene, triphenothiazine, and other metal complex compounds. When recording the data on the optical disk of this type, the recording marks are written to the organic dye material, and the recording layer of the organic dye material is very sensitive to the optimal recording power.

As the experimental results of the optical power calibration with respect to the organic-dye type optical disk, the proper recording power level "PoLPP" related to the match portion of the data signal which matches one of the prepits LPP and corresponds to one of the write marks M, as well as the optimal recording power "Poσ" related to the non-match portion of the data signal which does not match any of the prepits LPP but corresponds to one of the write marks M are obtained as shown in FIG. 7A. From these results, it has been found that, in order to obtain accurate detection of the preformat information and accurate reproduction of the data, the proper recording power level "PoLPP" should be set in a range from 95% to 85% of the optimal recording power "Poσ". In the case of the organic-dye type optical disk, the most suitable ratio of the proper recording power level to the optimal recording power for achieving accurate detection of the preformat information and accurate reproduction of the data is about 90%.

In a case of the phase-change type optical disk, the recording layer is made of a phase-change material. Suitable examples of the phase-change material for the optical disk of this type are Ge-Sb-Te alloys, Ge-Te-Sb-S alloys, Te-Ge-Sn-Au alloys, Ge-Sb-Sn alloys, Sb-Se alloys, Sb-Se-Te alloys, Ga-Se-Te alloys, Ga-Se-Te-Ge alloys, In-Se alloys, In-Se-Te alloys, and Ag-In-Sb-Te alloys. The phase change material of the optical disk of this type is set in the crystalline phase when it is heated and gradually cooled, and the crystalline-phase recording layer provides a high reflection coefficient. When the phase change material of the optical disk of this type is heated and rapidly cooled, it is in the amorphous phase, and the amorphous-phase recording layer provides a low reflection coefficient. Such a phase change of the recording layer is reversible, and overwriting data to the optical disk of this type is possible.

As the experimental results of the optical power calibration with respect to the phase-change type optical disk, the proper recording power level "PoLPP" related to the match portion of the data signal which matches one of the prepits LPP and corresponds to one of the write marks M, as well as the optimal recording power "Poσ" related to the non-match portion of the data signal which does not match any of the prepits LPP but corresponds to one of the write marks M are obtained as shown in FIG. 7B. From these results, it has been found that, in order to obtain accurate detection of the preformat information and accurate reproduction of the data, the proper recording power level "PoLPP" should be set in a range from 90% to 80% of the optimal recording power "Poσ". In the case of the phase-change type optical disk, the most suitable ratio of the proper recording power level to the optimal recording power for achieving accurate detection of the preformat information and accurate reproduction of the data is about 85%. In particular, the Ag-In-Sb-Te alloy phase-change type optical disk is very effective in allowing accurate detection of the preformat information and accurate reproduction of the data.

In the above-described embodiments, the write marks indicative of the data to be written are recorded in the grooves of the optical disk and the prepits indicative of the preformat information are recorded in the lands of the optical disk. Alternatively, the write marks may be recorded in the lands of the disk and the prepits may be recorded in the grooves of the disk.

Next, a description will be given of an optical disk drive to which an embodiment of the optical reproducing method of the invention is applied.

Figure 13:
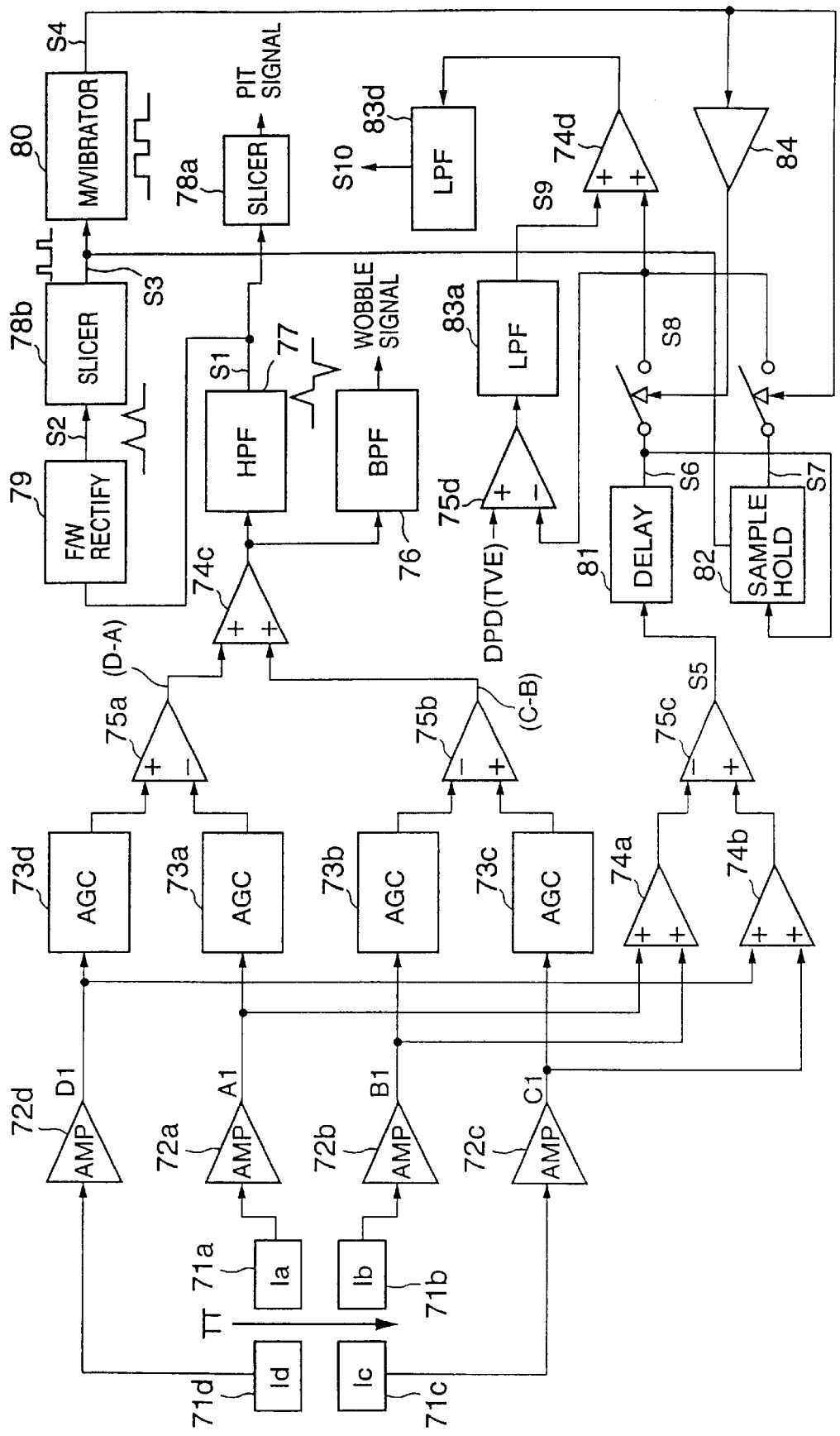
FIG. 13 is a block diagram of a prepit/wobble detection circuit of an optical disk drive to which an embodiment of the optical reproducing method of the invention is applied.

FIG. 13 shows a wobble/prepit detection circuit of an optical disk drive to which an embodiment of the optical reproducing method of the invention is applied.

Figure 14:
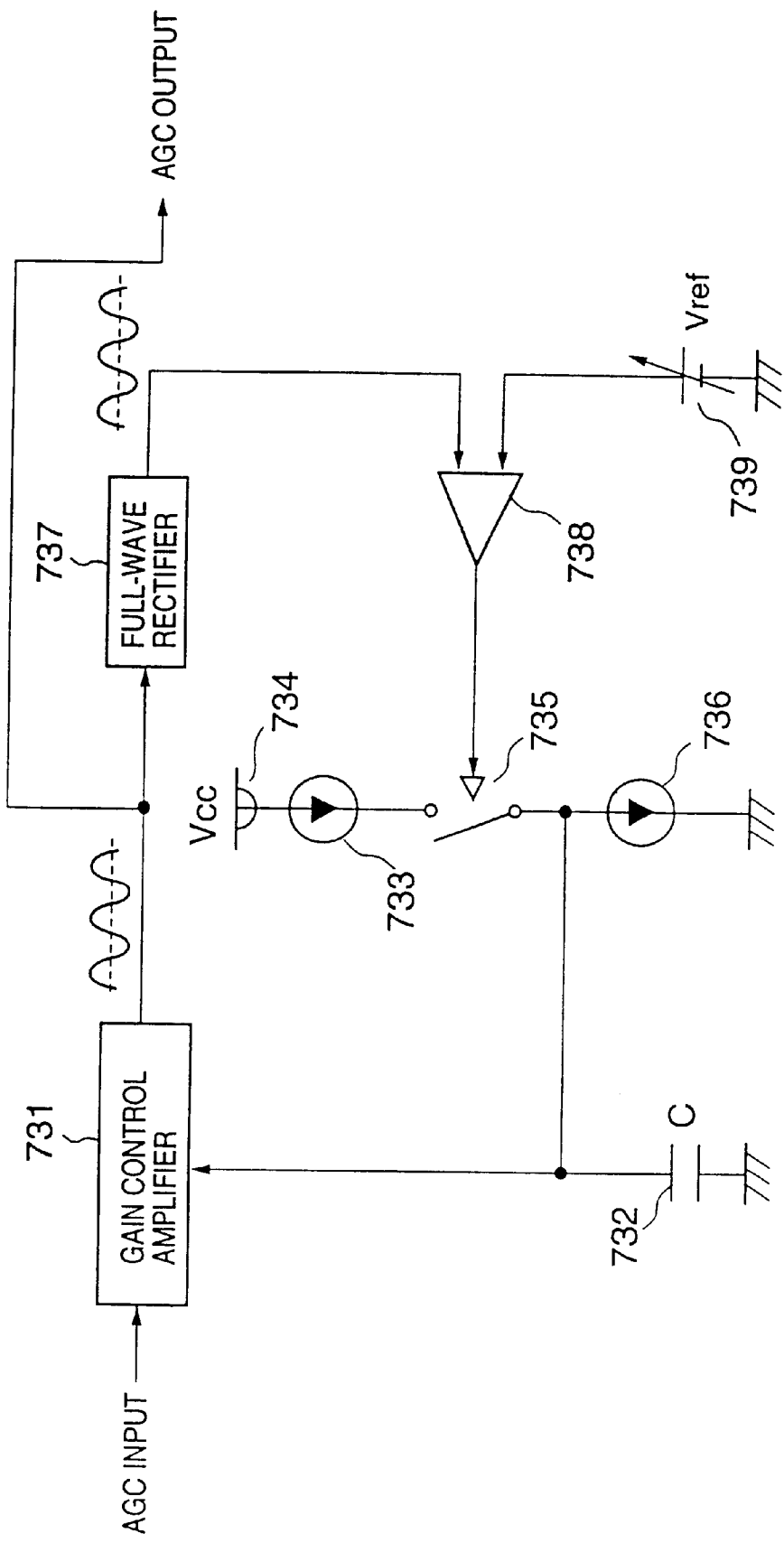
FIG. 14 is a block diagram of an automatic gain control circuit in the prepit/wobble detection circuit of FIG. 13.

FIG. 14 shows an automatic gain control circuit in the prepit/wobble detection circuit of FIG. 13.

FIG. 15A through FIG. 15J are time charts for explaining an operation of the prepit/wobble detection circuit of FIG. 13.

As shown in FIG. 13, the prepit/wobble detection circuit is provided with a 4-segment photodetector 71 of a pickup in the optical disk drive. The photodetector 71 includes four photodiodes (PDs) 71a through 71d which are arranged such that the PDs 71a and 71b and the PDs 71c and 71d confront each other and are arrayed in a tangential track (TT) direction of an optical disk to be accessed. Further, the photodiodes 71c and 71d are arranged in an inner-side disk surface portion of the optical disk and the photodiodes 71a and 71b are arranged in an outer-side disk surface portion of the optical disk. In other words, the photodiodes 71c and 71d are located near the optical disk center and the photodiodes 71a and 71b are located away from the optical disk center.

The optical disk is, for example, a DVD-R or DVD-RW. The optical disk of this type includes a disk surface portion in which wobble grooves, indicative of rotation control sync information, are formed in order to derive a wobble signal, and in which prepits, indicative of preformat information, are formed in order to derive a prepit signal. The prepits are formed in the lands between the wobble grooves of the optical disk and the write marks are formed in the wobble grooves of the optical disk when data is recorded to the disk. In the present embodiment, the prepit on each land of the optical disk carries the address information related to the neighboring groove (track) on the outer side of that land. Alternatively, the prepit on each land of the optical disk may carry the address information related to the neighboring groove (track) on the inner side of that land.

Each of the photodiodes 71a through 71d of the photodetector 71 detects a reflected laser beam from the optical disk when a laser beam is emitted by the pickup of the optical disk drive to the optical disk. The photodiodes 71a, 71b, 71c and 71d respectively output detection currents Ia, Ib, Ic and Id, each indicating the intensity of corresponding one of the reflected laser beams, to amplifiers 72a, 72b, 72c and 72d.

In response to the detection currents from the photodiodes 71a, 71b, 71c and 71d, the amplifiers 72a, 72b, 72c and 72d respectively output signals A1, B1, C1 and D1 to automatic gain control (AGC) circuits 73a, 73b, 73c and 73d. In addition, the signals A1 and B1 output from the amplifiers 72a and 72b are supplied to an adder 74a, while the signals C1 and D1 output from the amplifiers 72c and 72d are supplied to an adder 74b.

The AGC circuits 73a and 73d output signals A and D to a subtracter 75a, and the AGC circuits 73b and 73c output signals B and C to a subtracter 75b. The subtracter 75a produces a signal indicative of a difference between the signal D and the signal A. The subtracter 75b produces a signal indicative of a difference between the signal C and the signal B. The adder 74a produces a signal indicative of a sum of the signal A and the signal B. The adder 74b produces a signal indicative of a sum of the signal C and the signal D.

Both the difference signal (D−A) output by the subtracter 75a and the difference signal (C−B) output by the subtracter 75b are supplied to an adder 74c. The adder 74c outputs a track-error signal indicative of a sum of the difference signal (D−A) and the difference signal (C−B). In other words, the track-error signal at the output of the adder 74c is indicative of the difference between the detection currents (Ic+Id) and the detection currents (Ia+Ib).

Both the sum signal (A+B) output by the adder 74a and the sum signal (C+D) output by the adder 74b are supplied to a subtracter 75c. The subtracter 75c outputs a push-pull signal indicative of a difference between the sum signal (A+B) and the sum signal (C+D).

In the prepit/wobble detection circuit of FIG. 13, each of the AGC circuits 73a through 73d, which are connected to the photodiodes 71a through 71d via the amplifiers 72a through 72d, each of the AGC circuits 73a through 73d is constituted by a circuit configuration of FIG. 14. As shown in FIG. 14, the AGC circuit includes a gain control amplifier 731, a capacitor 732, a constant-current source 733, a constant-voltage source 734, a switch 735, a constant-current source 736, a full-wave rectifier 737, a comparator 738, and a reference voltage supply 739. The AGC circuit controls the amplitude of the output signal at a constant level regardless of fluctuations of the amplitude of the input signal (the detection current at the photodiode). A reference voltage Vref supplied by the reference voltage supply 739 can be arbitrarily set by the prepit/wobble detection circuit of FIG. 13. Hence, the gains of the AGC circuits 73a through 73d in the prepit/wobble detection circuit of FIG. 13 can be suitably changed by setting the reference voltages Vref of the AGC circuits 73a through 73d.

In the present embodiment of the optical reproducing method according to the invention, even when the write mark is radially adjacent to the prepit in the optical disk, the detection of the prepit signal and the wobble signal from the optical disk is carried out by making use of the wobble/prepit detection circuit of FIG. 13 so as to make the detection of the prepit signal optimal.

More specifically, in the present embodiment, the wobble/prepit detection circuit of FIG. 13 includes the AGC units 73a–73d which are provided for the photodiodes 71a–71d of the photodetector 71 of the pickup in the optical disk drive. The AGC units 73a–73d are connected to the photodiodes 71a–71d, and each AGC unit provides a gain of the detection current output by a corresponding one of the photodiodes 71a–71d.

As previously described, the optical disk drive contains the control module shown in FIG. 1 which includes the elements 6 through 9. The RF detector 7 outputs an RF signal based on the waveform equalization of the sum signal "(A+B)+(C+D)". The clock generator 8 outputs a clock signal based on the RF signal output by the RF detector 7. The EFM decoder 9 outputs a read-back data signal based on the RF signal output by the RF detector 7 and on the clock signal output by the clock generator 8. Hence, the optical disk drive detects a portion of the read-back data signal which matches one of the prepits and corresponds to the write mark radially adjacent to one of the prepits.

The wobble/prepit detection circuit of FIG. 13 detects the wobble signal and the prepit signal along the track of the disk, using optimal gains of the AGC units 73a–73d, in accordance with a non-match portion of the data signal which does not match any of the prepits but corresponds to a write mark. The optimal gains of the AGC units 73a–74d in the prepit/wobble detection circuit of FIG. 13 are predetermined by setting the reference voltages Vref of the AGC units as shown in FIG. 14.

When the write marks on the groove are not radially adjacent to any of the prepits on the inner neighboring land during the data reproduction, the prepit signal and the wobble signal can be accurately detected without significant degradation. On the other hand, when the write mark on the groove is radially adjacent to one of the prepits on the inner neighboring land during the data reproduction, the degradation of the prepit signal due to the presence of the write mark becomes significant.

Suppose that the photodiodes 71c and 71d are located near the optical disk center and the photodiodes 71a and 71b are located away from the optical disk center, and that the prepit on the land of the optical disk carries the address information related to the neighboring groove on the outer side of that land. In the present case, because of the presence of the write mark radially adjacent to the prepit on the inner neighboring land, the detection current Id at the output of the photodiode 71d is larger than the detection current Ia at the output of the photodiode 71a, and the detection current Ic at the output of the photodiode 71c is larger than the detection current Ib at the output of the photodiode 71b.

In order to eliminate the influence of the neighboring write mark, the wobble/prepit detection circuit of FIG. 13 detects the wobble signal and the prepit signal along the track of the disk, using reduced gains of the AGC units 73c and 73d (half of the AGC units 73a–73d) and the optimal gains of the AGC units 73a and 73b (the other half of the AGC units 73a–73d), in accordance with the match portion of the data signal. The reduced gains of the AGC units 73c and 74d in the prepit/wobble detection circuit of FIG. 13 are predetermined by setting the reference voltages Vref of the AGC units (FIG. 14) so as to make the detection of the prepit signal optimal.

As described above, the prepit/wobble detection circuit of FIG. 13 acts to eliminate the noise due to the influence of the neighboring write mark from the track-error signal at the output of the adder 74c in the above-mentioned case. The track-error signal at the output of the adder 74c contains both the prepit-signal component and the wobble-signal component.

In the prepit/wobble detection circuit of FIG. 13, the track-error signal output by the adder 74c is supplied to each of a band-pass filter (BPF) 76 and a high-pass filter (HPF) 77. The BPF 76 has a pass band which corresponds to the wobble frequency of the wobble grooves formed in the optical disk. The BPF 76 outputs the wobble signal (S10) by allowing only the wobble-signal component in the track-error signal to pass through the filter (BPF). The HPF 77 has a pass band which starts from a high frequency corresponding to the frequency of the prepits formed in the optical disk. The HPF 77 outputs the prepit signal (S1) by allowing only the prepit-signal component in the track-error signal to pass through the filter (HPF).

FIG. 15A indicates a waveform of the prepit signal S1 at the output of the HPF 77. The plus-side peaks in the waveform of the prepit signal S1 of FIG. 15A correspond to the prepits on the inner neighboring lands in the optical disk.

In the prepit/wobble detection circuit of FIG. 13, the prepit signal (S1) output by the HPF 77 is supplied to a slicer 78a. The slicer 78a converts the prepit signal S1 into a processed prepit signal based on a slice level of the slicer 78a, so that the address information of the prepits on the inner neighboring lands only is produced from the processed prepit signal.

In the prepit/wobble detection circuit of FIG. 13, the prepit signal (S1) output by the HPF 77 is also supplied to a full-wave rectifier 79. The full-wave rectifier 79 outputs a rectified prepit signal (S2). The rectified signal (S2) is supplied to a slicer 78b. The slicer 78b converts the rectified prepit signal S2 into a processed prepit signal (S3) based on a slice level of the slicer 78b. The prepit signal (S3) is supplied to a monostable multivibrator 80. The pulsewidth of the prepit signal S3 at the output of the slicer 78b changes according to the amplitude of the prepit signal S3. The multivibrator 80 maintains the pulsewidth of the prepit signal (S4) at a constant level, and outputs the prepit signal (S4) to each of an inverter 84 and a switch at the output of a sample-hold unit 82.

FIG. 15B indicates a waveform of the prepit signal S2 at the output of the rectifier 79. FIG. 15C indicates a waveform of the prepit signal S3 at the output of the slicer 78b. FIG. 15D indicates a waveform of the prepit signal S4 at the output of the multivibrator 80.

As described above, the subtracter 75c outputs the push-pull signal (S5) indicative of the difference between the sum signal (A+B) and the sum signal (C+D). FIG. 15E indicates a waveform of the push-pull signal S5 at the output of the subtracter 75c. As shown in FIG. 15E, when the prepit-signal component in the push-pull signal S5 has a non-sinusoidal waveform and a non-constant period, it is difficult to completely remove the prepit-signal component from the push-pull signal S5 by using a low-pass filter only. This problem significantly arises when the recording density of the optical disk is high and the track pitch of the disk is small.

In the prepit/wobble detection circuit of FIG. 13, the push-pull signal S5 output by the subtracter 75c is supplied to a delay unit 81. The delayed push-pull signal (S6) output by the delay unit 81 is supplied through a switch to an inverting input of a subtracter 75d. The delayed push-pull signal (S6) output by the delay unit 81 is also supplied to the sample-hold unit 82.

The prepit signal S3 output by the slicer 78b is also supplied to the sample-hold unit 82, and the output of the delay unit 81 is always held by using the prepit signal S3. The processed push-pull signal (S7) output by the sample-hold unit 82 is supplied through the switch to the inverting input of the subtracter 75d.

The prepit signal S4 output by the multivibrator 80 indicates the presence of the prepit in the optical disk. When the prepit signal S4 at the output of the multivibrator 80 is set in the high state, the switch at the output of the sample-hold unit 82 is turned ON so that the push-pull signal S7 is supplied to the subtracter 75d. At this time, the switch at the output of the delay unit 81 is turned OFF. On the other hand, when the prepit signal S4 at the output of the multivibrator 80 is set in the low state, the switch at the output of the delay unit 81 is turned ON so that the push-pull signal S6 is supplied to the subtracter 75d. At this time, the switch at the output of the sample-hold unit 82 is turned OFF. In this manner, a prepit-removal signal S8 is supplied to the inverting input of the subtracter 75d.

FIG. 15F shows a waveform of the push-pull signal S6 output by the delay unit 81. FIG. 15G shows a waveform of the push-pull signal S7 output by the sample-hold unit 82.

FIG. 15H shows a waveform of the prepit-removal signal SB input to the subtracter 75d.

Figure 16:
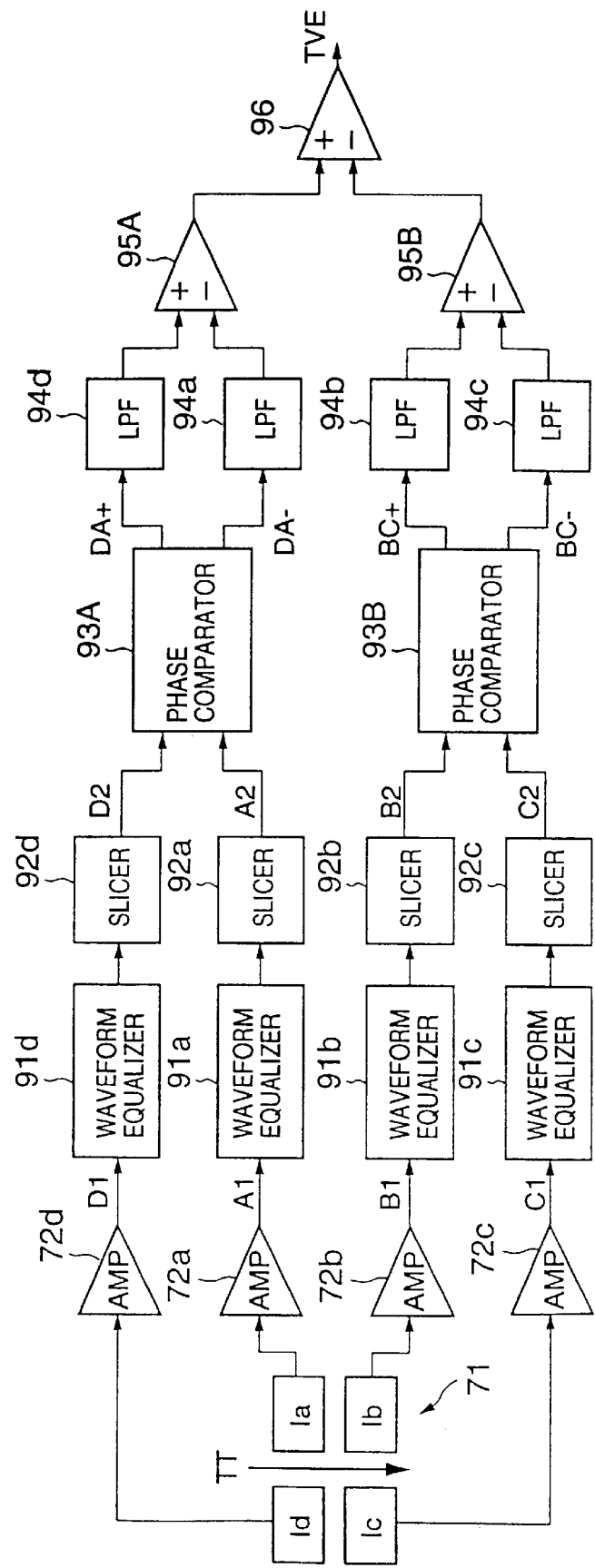
FIG. 16 is a block diagram of a tracking error detection circuit of a DVD-ROM drive.

FIG. 16 shows a tracking error detection circuit of an existing DVD-ROM drive.

Figure 17A:
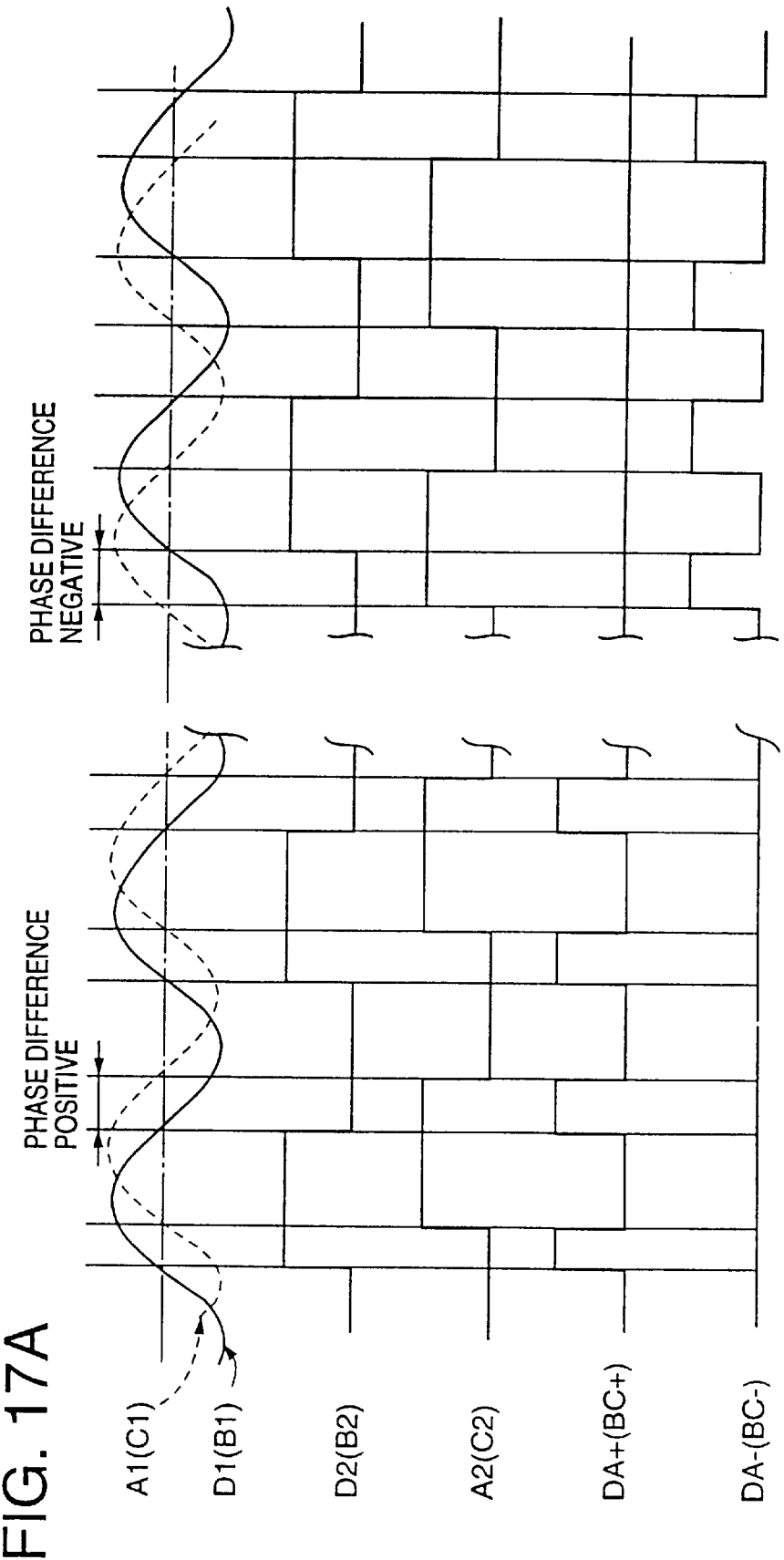
FIG. 17A and FIG. 17B are time charts for explaining an operation of the tracking error detection circuit of FIG. 16.
Figure 17B:
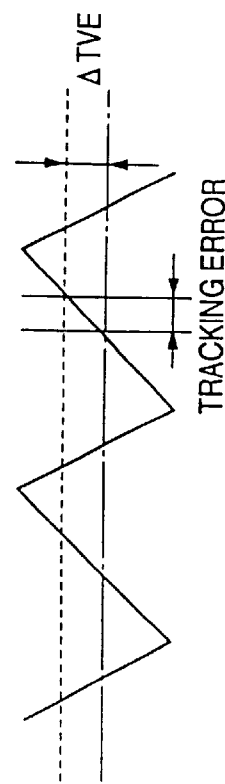

FIG. 17A and FIG. 17B are time charts for explaining an operation of the tracking error detection circuit of FIG. 16.

As shown in FIG. 16, this tracking error detection circuit utilizes a known differential phase detection (DPD) method. The tracking error detection circuit is provided with the 4-segment photodetector 71 and the amplifiers 72a, 72b, 72c and 72d, which are the same as corresponding elements in the prepit/wobble detection circuit of FIG. 13. The amplifiers 72a, 72b, 72c and 72d are respectively connected to waveform equalizers 91a, 91b, 91c and 91d. The waveform equalizers 91a, 91b, 91c and 91d are respectively connected to slicers 92a, 92b, 92c and 92d. The slicers 92d and 92a are connected to a phase comparator 93A, and the slicers 92b and 92c are connected to a phase comparator 93B. The phase comparator 93A is connected to low-pass filters (LPF) 94d and 94a, and the phase comparator 93B is 10 connected to low-pass filters (LPF) 94b and 94c. The low-pass filters 94d and 94a are connected to a differential amplifier 95A, and the low-pass filters 94b and 94c are connected to a differential amplifier 95B. The differential amplifiers 95A and 95B are connected to a differential amplifier 96. The differential amplifier 96 outputs a DPD signal (TVE) to a non-inverting input of the subtracter 75d in the prepit/wobble detection circuit of FIG. 13.

In the time charts of FIG. 17A and FIG. 17B, the output signals of the elements of the tracking error detection circuit, which are indicated by "A1", "B1", "C1", "D1", "A2", "B2", "C2", "D2", "DA−"1, "DA+", "BC−", "BC+"and "TVE" in FIG. 16 are illustrated. For the sake of simplicity of description, suppose that the write-mark periods of the detection currents output by the photodiodes of the photodetector 71 are equal to each other, and there is no distortion of the reflection beam pattern on the photodetector 71 due to the tracking error.

Generally, it is known that the tracking error signal obtained by using the differential phase detection (DPD) method is unlikely to carry the offset component due to a tilt (called the disk tilt) of the optical axis of the objective lens with respect to the optical disk surface.

The tracking error detection circuit of FIG. 16 is usually attached to an existing DVD-ROM drive, and this circuit is useful for reading data from a DVD-ROM. By using the tracking error detection circuit of FIG. 16, the DPD signal (TVE) as shown in FIG. 17B is supplied to the non-inverting input of the subtracter 75d in the prepit/wobble detection circuit of FIG. 13. The tracking error detection circuit of FIG. 16 can provide an easy, cost-effective way to supply the DPD signal to the prepit/wobble detection circuit of FIG. 13.

Referring back to FIG. 13, in the prepit/wobble detection circuit, the subtracter 75d outputs a signal indicative of a difference between the DPD signal (TVE) and the prepit-removal signal S8, to a low-pass filter (LPF) 83a. The LPF 83a has a pass band which starts from a low frequency corresponding to the disk-tilt offset component in the DPD signal. The LPF 83a outputs an offset detection signal (S9) by allowing only the disk-tilt offset component in the DPD signal to pass through the filter (LPF). The offset detection signal S9 output by the LPF 83a and the prepit-removal signal S8 are supplied to an adder 74d. In the adder 74d, the offset component is removed from the prepit-removal signal S8.

The output signal of the adder 74d is supplied to a low-pass filter (LPF) 83b. The LPF 83b has a pass band which starts from a low frequency corresponding to only the tracking control component in the output signal of the adder 74d. The LPF 83b outputs a tracking error signal S10 in which the noise due to the influence of the neighboring write mark and the offset component due to the disk tilt are eliminated.

FIG. 15I shows a waveform of the offset detection signal S9 output by the low-pass filter 83a. FIG. 15J shows a waveform of the tracking error signal S10 output by the low-pass filter 83b.

In the above-described embodiment, the wobble signal and the prepit signal are detected along the track of the optical disk by selectively using the optimal gains or the reduced gains of the AGC units in accordance with the non-match portion or the match portion of the data signal. Even when the write mark is radially adjacent to the prepit in the optical disk, it is possible to accurately detect the wobble signal and the prepit signal from the optical disk with good reliability.

Next, a description will be given of an embodiment of the wobble/prepit detection method of the invention for optical recording and reproduction of the optical disk, with reference to FIG. 18.

FIG. 18 shows the track offset vs. prepit detection error characteristics of the wobble/prepit detection circuit of FIG. 13 as the experimental results of the prepit detection process for the optical disk. In FIG. 18, the track offset, produced by setting the reference voltages Vref of the AGC units (FIG. 14), is increased from a low level to a high level, and the block error ratio (prepit detection error) of the address information reproduced from the prepit signal are plotted for each track offset.

In the prepit detection process, suppose that, in the wobble/prepit detection circuit of FIG. 13, the photodiodes 71c and 71d are located near the optical disk center and the photodiodes 71a and 71b are located away from the optical disk center, and that the optical disk accessed by the wobble/prepit detection circuit of FIG. 13 includes the disk surface portion in which wobble grooves, indicative of rotation control sync information, are formed in order to derive a wobble signal, and in which prepits, indicative of preformat information, are formed in order to derive a prepit signal. The prepits are formed in the lands between the wobble grooves of the optical disk and the write marks are formed in the wobble grooves of the optical disk when data is recorded to the disk. In the present embodiment, the prepit on each land of the optical disk carries the address information related to the neighboring groove (track) on the outer side of that land. Alternatively, the prepit on each land of the optical disk may carry the address information related to the neighboring groove (track) on the inner side of that land.

In the characteristics of FIG. 18, when a light spot, produced on the optical disk by the laser beam emitted by the pickup of the optical disk drive, is at the center of one of the wobble grooves of the optical disk, the track offset is equal to 0.00. As shown in FIG. 18, when the track offset is equal to 0.00, the block error ratio (BER) or the prepit detection error of the address information from the prepit signal is the minimum, which achieves accurate detection of the prepit signal. This track offset is called the optimal track offset. At this time, the amount of jitter in data recording is also the minimum.

If the write mark on the groove is radially adjacent to one of the prepits on the inner neighboring land, during the data reproduction or recording, and the light spot is shifted from the groove center toward the prepit on the inner neighboring land, the amplitude of the prepit signal detected can be increased. The direction of shifting the light spot from the groove center is the same as the decreasing direction of the track offset indicated by the arrow in FIG. 18. As shown in FIG. 18, there is a margin of the prepit detection error to the permissible level in which the track offset can be corrected to increase the prepit signal amplitude with no degradation of the prepit detection accuracy.

As shown in FIG. 18, if the light spot is shifted from the groove center in the opposite direction (or the increasing direction of the track offset), the prepit detection error is rapidly increased and the prepit detection accuracy is considerably degraded.

In the present embodiment, when the write mark on the groove is radially adjacent to one of the prepits on the inner neighboring land during the data reproduction or recording, the track offset is corrected from the optimal track offset so as to maximize the margin of the prepit detection error to the permissible level. This track margin is called the corrected track margin. In the example of FIG. 18, the corrected track offset is set to −0.03 μm away from the optimal track offset in the decreasing direction indicated by the arrow in FIG. 18.

In the present embodiment, the wobble/prepit detection circuit of FIG. 13 detects the wobble signal and the prepit signal along the track of the disk, using the optimal track offset (FIG. 18), in accordance with the non-match portion of the data signal which does not match any of the prepits but corresponds to a write mark. The optimal gains of the AGC units 73a–74d in the prepit/wobble detection circuit of FIG. 13 are predetermined by setting the reference voltages Vref of the AGC units (FIG. 14) so as to achieve the optimal track offset.

When the write marks on the groove are not radially adjacent to any of the prepits on the inner neighboring land during the data reproduction or recording, the prepit signal and the wobble signal can be accurately detected without significant degradation. On the other hand, when the write mark on the groove is radially adjacent to one of the prepits on the inner neighboring land during the data reproduction or recording, the degradation of the prepit signal due to the presence of the write mark becomes significant.

Suppose that the photodiodes 71c and 71d are located near the optical disk center and the photodiodes 71a and 71b are located away from the optical disk center, and that the prepit on the land of the optical disk carries the address information related to the neighboring groove on the outer side of that land. In the present case, because of the presence of the write mark radially adjacent to the prepit on the inner neighboring land, the detection current Id at the output of the photodiode 71d is larger than the detection current Ia at the output of the photodiode 71a, and the detection current Ic at the output of the photodiode 71c is larger than the detection current Ib at the output of the photodiode 71b.

In order to eliminate the influence of the neighboring write mark, the wobble/prepit detection circuit of FIG. 13 detects the wobble signal and the prepit signal along the track of the disk, using the corrected track offset (FIG. 18), in accordance with the match portion of the data signal. The reduced gains of the AGC units 73c and 74d in the prepit/wobble detection circuit of FIG. 13 are predetermined by setting the reference voltages Vref of the AGC units (FIG. 14) so as to achieve the corrected track offset and make the detection of the wobble signal reasonably possible. In practice, when determining the corrected track offset, it is necessary to take into consideration that both the prepit signal detection and the wobble signal detection should be maintained at a reasonably high accuracy.

As described above, the prepit/wobble detection circuit of FIG. 13 acts to eliminate the noise due to the influence of the neighboring write mark from the track-error signal at the output of the adder 74c in the above-mentioned case. The track-error signal at the output of the adder 74c contains both the prepit-signal component and the wobble-signal component. In the wobble/prepit detection method of the present embodiment, the wobble signal and the prepit signal are detected along the track of the optical disk by selectively using the optimal track offset or the corrected track offset in accordance with the non-match portion or the match portion of the data signal. Even when the write mark is radially adjacent to the prepit in the optical disk, it is possible to accurately detect the wobble signal and the prepit signal from the optical disk with good reliability.

The present invention is not limited to the above-described embodiments, and variations and modifications may be made without departing from the scope of the present invention.

Further, the present invention is based on Japanese priority application No. 10-288,336, filed on Oct. 9, 1998, Japanese priority application No. 10-288,341, filed on Oct. 9, 1998, Japanese priority application No. 10-321,006, filed on Nov. 11, 1998, Japanese priority application No. 11-016, 684, filed on Jan. 26, 1999, and Japanese priority application No. 11-016,687, filed on Jan. 26, 1999, the entire contents of which are hereby incorporated by reference.

What is claimed is:

1. An optical recording method for an optical disk having a disk surface portion in which prepits, indicative of pre-format information, are formed, comprising the steps of:

detecting a portion of a data signal which matches one of the prepits and corresponds to a write mark radially adjacent to said one of the prepits;

recording marks along a track of the disk, using an optimal recording power, in accordance with a non-match portion of the data signal which does not match any of the prepits but corresponds to a write mark, said recorded marks having a first width in a radial direction of the disk; and recording marks along the track of the disk, using a proper recording power level, in accordance with the match portion of the data signal, said recorded marks having a second width in the radial direction which is smaller than the first width.

2. The optical recording method according to claim 1, wherein the proper recording power level is set to a predetermined ratio of the optimal recording power.

3. The optical recording method according to claim 1, wherein a laser pulse duration, corresponding to the match portion of the data signal, is reduced from an optimal laser pulse duration, corresponding to the non-match portion of the data signal, to a predetermined ratio of the optimal laser pulse duration.

4. The optical recording method according to claim 1, further comprising the steps of:

repeating recording and reproducing of data to and from a power calibration area of the disk while incrementing a recording power of a laser diode; and determining the optimal recording power and the proper recording power level based on the reproduced data.

5. The optical recording method according to claim 1, further comprising the steps of:

repeating recording and reproducing of data to and from a power calibration area of the disk while incrementing a recording power of a laser diode;

determining the optimal recording power based on the reproduced data;

reading out a proper-to-optimal power ratio; and determining the proper recording power level by a product of the optical recording power by the proper-to-optimal power ratio.

6. The optical recording method according to claim 2, wherein the proper recording power level used when recording the write marks in accordance with the match portion of the data signal, is set in a range from 95% to 80% of the optimal recording power used when recording the write marks in accordance with the non-match portion of the data signal.

7. The optical recording method according to claim 1, wherein the detection of the match portion of the data signal, in said detecting step, is based on an effective period of a prepit detection window signal.

8. The optical recording method according to claim 1, further comprising the steps of generating a wobble peak signal from a reflected light beam from the disk; and generating a prepit detection window signal based on the wobble peak signal, wherein the detection of the match portion of the data signal, in said detecting step, is based on an effective period of the prepit detection window signal.

9. The optical recording method according to claim 7, further comprising the step of: determining the proper recording power level by reducing the optimal recording power to a predetermined ratio of the optimal recording power.

10. The optical recording method according to claim 1, wherein the write marks recorded by using the proper recording power level have a tangential width in a tangential track direction of the disk, which is substantially equal to a tangential width of the write marks recorded by using the optimal recording power.

11. The optical recording method according to claim 1, wherein the write marks are recorded in one of grooves and lands of the disk and the prepits are recorded in the other of the grooves and the lands.

12. An optical reproducing method for an optical disk having a disk surface portion in which wobble grooves indicative of rotation control sync information are formed to create a wobble signal, and prepits indicative of preformat information are formed to create a prepit signal, the optical reproducing method comprising the steps of:

providing an automatic gain control AGC unit for each of photodiodes contained in a photodetector of a pickup, said AGC units being connected to the photodiodes, and each AGC unit providing a gain of a detection current output by a corresponding one of the photodiodes;

detecting a portion of a data signal which matches one of the prepits and corresponds to one of write marks radially adjacent to said one of the prepits;

detecting the wobble signal and the prepit signal along a track of the disk, using optimal gains of the AGC units, in accordance with a non-match portion of the data signal which does not match any of the prepits but corresponds to one of the write marks; and detecting the wobble signal and the prepit signal along the track of the disk, using reduced gains of a first half of the AGC units and the optimal gains of a second half of the AGC units, in accordance with the match portion of the data signal.

13. The optical reproducing method according to claim 12, wherein the wobble signal and the prepit signal are detected based on a track-error signal, the track-error signal being indicative of a difference between the detection currents output by a first half of the photodiodes and the detection currents output by a second half of the photodiodes.

14. The optical reproducing method according to claim 12, further comprising the step of generating a differential phase detection DPD signal based on the detection currents output by the photodiodes of the photodetector.

15. The optical reproducing method according to claim 12, further comprising the steps of:

generating a push-pull signal based on the detection currents output by the photodiodes of the photodetector; and generating an offset detection signal based on the push-pull signal and based on a differential phase detection DPD signal.

16. The optical reproducing method according to claim 15, wherein the DPD signal is generated based on the detection currents output by the photodiodes of the photodetector, by using a tracking error detection circuit.

17. The optical reproducing method according to claim 12, further comprising the steps of:

detecting a position of one of the prepits in the optical disk based on the prepit signal;

generating a push-pull signal based on the detection currents output by the photodiodes of the photodetector; and generating a prepit-removal signal from the push-pull signal in accordance with the position of one of the prepits in the optical disk.

18. The optical reproducing method according to claim 12, wherein the prepits are formed in lands between the wobble grooves of the optical disk, and the write marks are formed in the wobble grooves of the optical disk when recording data to the optical disk, and wherein one of the prepits on one of the lands carries address information related to a neighboring groove on an outer side of said one of the lands in the optical disk.

19. The optical reproducing method according to claim 12, wherein the photodetector includes first photodiodes and second photodiodes which are arranged such that the first photodiodes and the second photodiodes confront each other and are arrayed in a tangential track direction of the optical disk, and that the second photodiodes are located near a center of the optical disk and the first photodiodes are located away from the optical disk center.

20. The optical reproducing method according to claim 12, wherein the write marks are recorded in one of grooves and lands of the optical disk before the detection of the wobble signal and the prepit signal, and the prepits are recorded in the other of the grooves and the lands.

21. A wobble/prepit detection method for optical recording and reproduction of an optical disk having a disk surface portion in which wobble grooves indicative of rotation control sync information are formed, and prepits indicative of preformat information are formed, the wobble/prepit detection method comprising the steps of:

detecting a portion of a data signal which matches one of the prepits and corresponds to one of write marks radially adjacent to said one of the prepits;

detecting a wobble signal and a prepit signal along a track of the disk, using an optimal track offset, in accordance with a non-match portion of the data signal which does not match any of the prepits but corresponds to one of the write marks; and detecting the wobble signal and the prepit signal along the track of the disk, using a corrected track offset, in accordance with the match portion of the data signal, the corrected track offset having a margin of a prepit detection error to a permissible level, which margin being larger than a margin corresponding to the optimal track offset.

22. The wobble/prepit detection method according to claim 21, wherein the corrected track offset is determined so as to enable the detection of the wobble signal using the corrected track offset.

\* \* \* \* \*